(12) United States Patent
Brainard et al.

(10) Patent No.: US 6,353,311 B1
(45) Date of Patent: Mar. 5, 2002

(54) UNIVERSAL PARTICLE FLUX PRESSURE CONVERTER

(76) Inventors: John P. Brainard, 1419 White Rim Pl. NE., Albuquerque, NM (US) 87112; Robert D. Ney; Robert J. Ney, both of 1304 Narcisco St. NE., Albuquerque, NM (US) 87112-6615

(*) Notice: Subject to any disclaimer, the term of this patent is extended or adjusted under 35 U.S.C. 154(b) by 0 days.

(21) Appl. No.: 09/109,595

(22) Filed: Jul. 2, 1998

(51) Int. Cl.$^7$ ................................................ G01M 1/12
(52) U.S. Cl. ........................ 324/72; 324/457; 73/382 R
(58) Field of Search .......................... 324/72, 457, 452; 73/382 R, 105; 376/153, 245

(56) References Cited

U.S. PATENT DOCUMENTS

| | | | |
|---|---|---|---|
| 3,114,264 A | * 12/1963 | Williamson | 73/382 G |
| 3,245,263 A | * 4/1966 | Cornelison | 73/383 |
| 3,315,526 A | * 4/1967 | Schulze | 73/383 |
| 3,722,286 A | * 3/1973 | Weber | 73/382 G |
| 4,576,777 A | * 3/1986 | Weber | 376/153 |
| 4,968,475 A | * 11/1990 | Drukier et al. | 376/153 |
| 5,276,717 A | * 1/1994 | Weber | 376/156 |

* cited by examiner

*Primary Examiner*—Safet Metjahic
*Assistant Examiner*—T. R. Sundaram

(57) ABSTRACT

The design of Shaded Rotor devices to demonstrate the existence of a hypothetical Universal Particle Flux Field is presented. These devices should extract a measurable amount of energy from this Field. We believe the Universal Particle Flux Field can explain all invisible forces at a distance phenomena between masses, charged bodies, and magnetic materials. We propose that the Universal Particle Flux Field is a simultaneously convergent/divergent field, where the particle streams traverse to any point in the Universe from every other point in the Universe. The order of this Flux Field is a nearly perfect disorder, which is an order in itself. The strength of the gravitational component of this Field is conventionally denoted by "G". Two neutral masses immersed in such Flux Field will develop forces between them, which are consistent with Newton's Equation of Gravitation. This Field is also consistent with Electrostatic, and Magnetic Force Equations. A magnetic rotor is preferentially shaded with a magnetic stator so that a net torque exists on the rotor. This principle is also applied to an electrostaticly charged Shaded Rotor device. The possibilities that the Beta, the Muon, and the Tau Neutrinos are the Universal Particles and they are producing the Electrostatic, Magnetic, and Gravitational Force Fields respectively, are explored. Laboratory sized Shaded Rotor Devices can be constructed using magnetic and/or electrostatic components; detailed designs are described herein. Circumstantial evidences described herein, indicate that the Universal Gravitational Constant "G" hence the "g" of the Earth is direction and time variable, and it has significantly increased during the last several hundred million years; this may account for the demise of the Dinosaurs, and of the giant vegetation.

25 Claims, 8 Drawing Sheets

Figure 1:
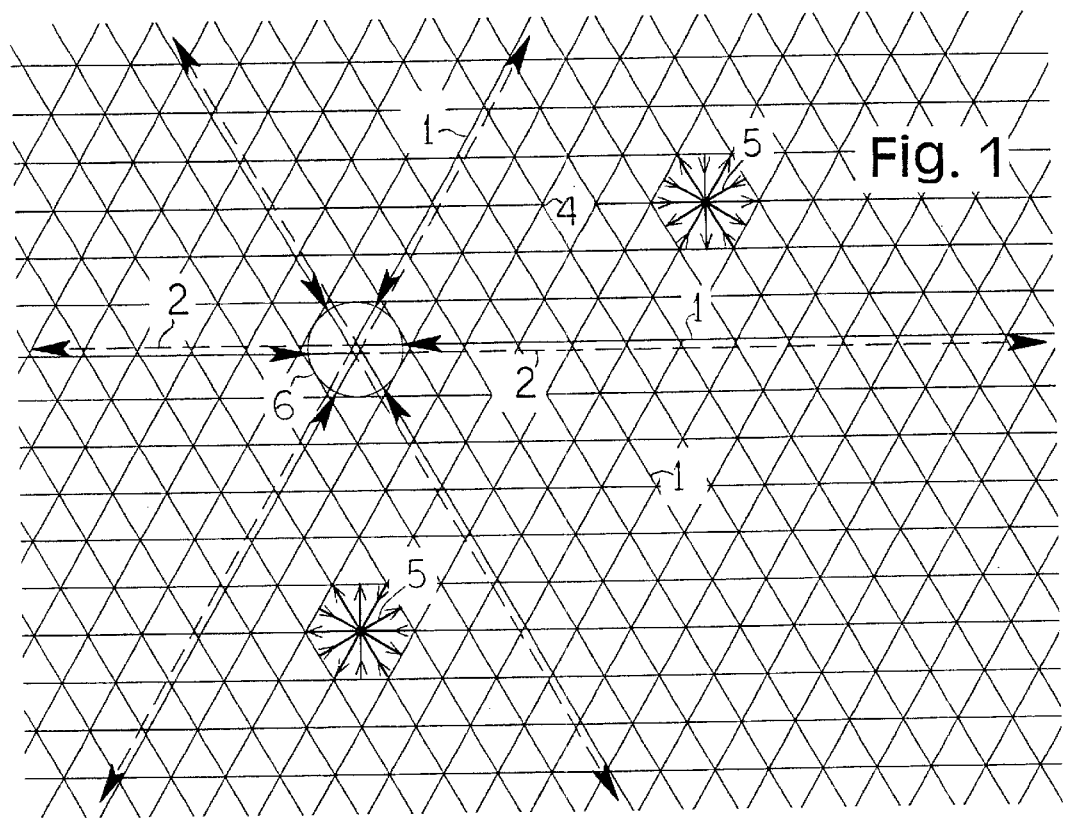

$N - N_E = n$    $n = Cg$ $$F_S = 2C \Delta n - C \Delta^2 n)  \qquad F_P = 2C \Delta n$$

$$\Delta F = F_S - F_P = -C \Delta^2 n$$

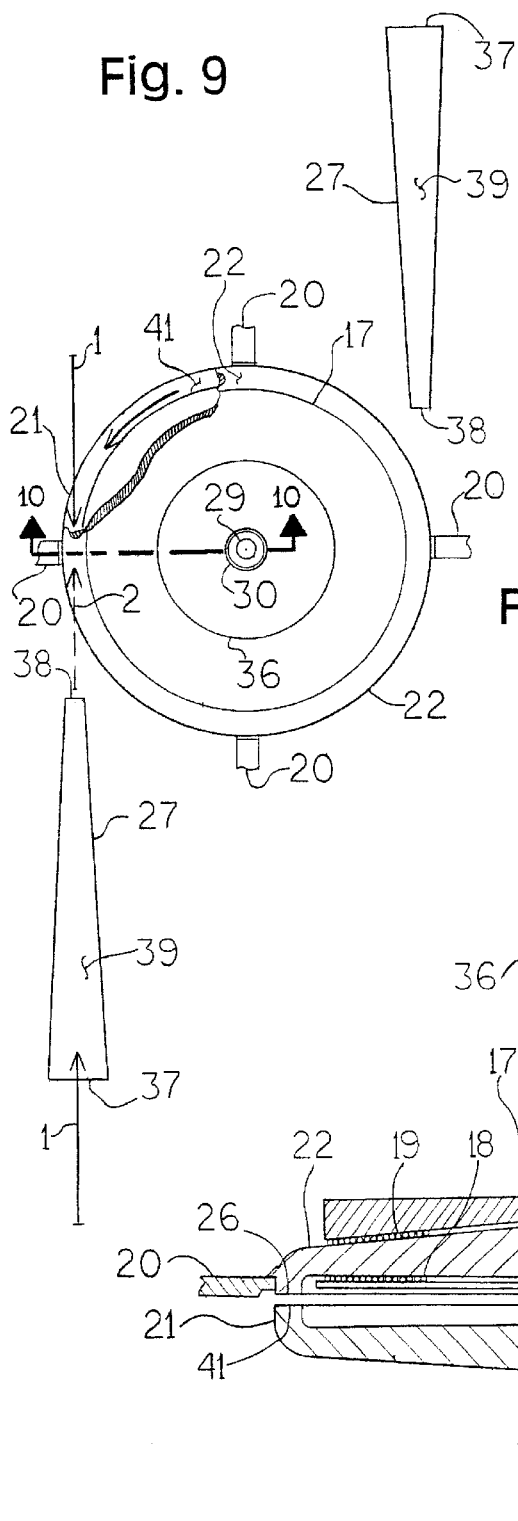
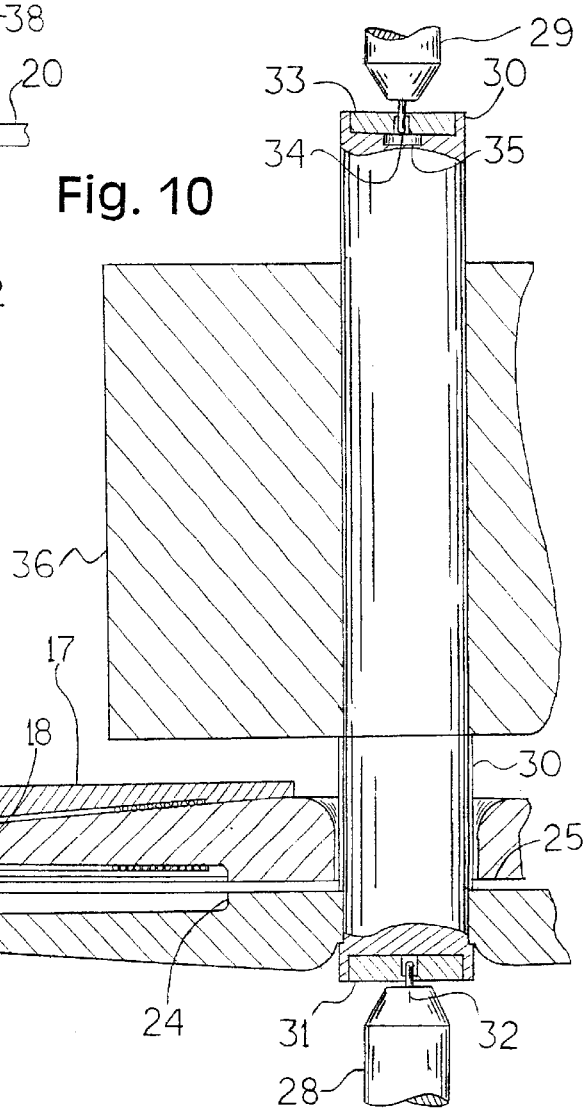
Fig. 9
Fig. 10

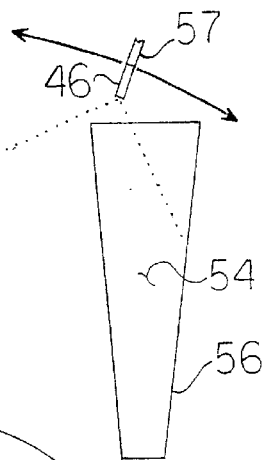
Fig. 13
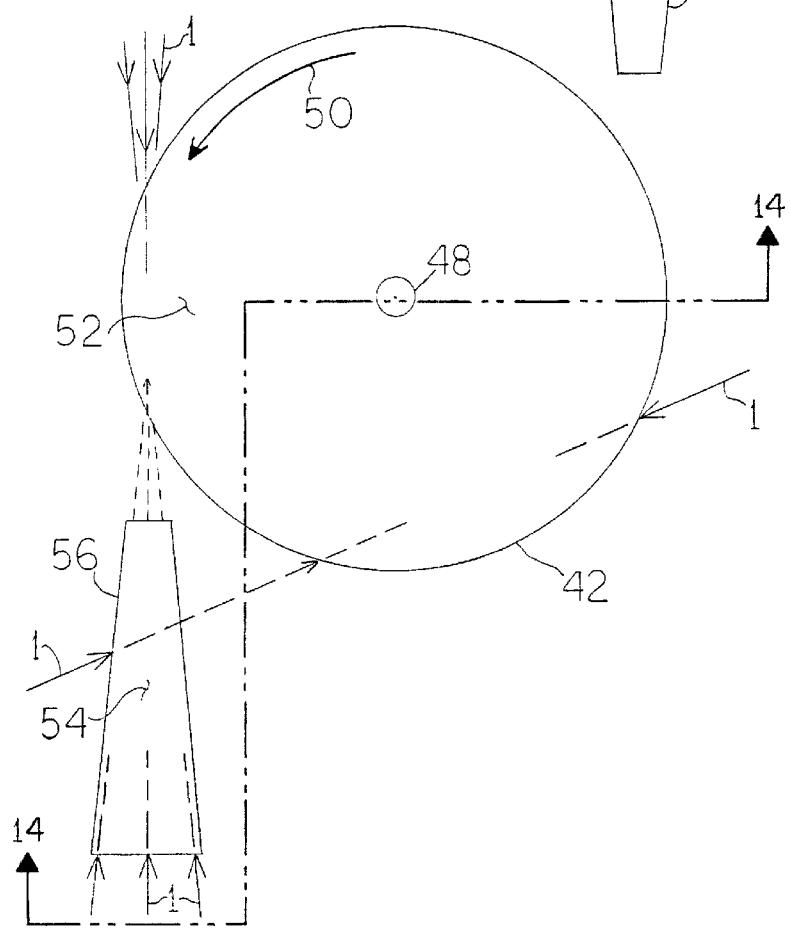
Fig. 14
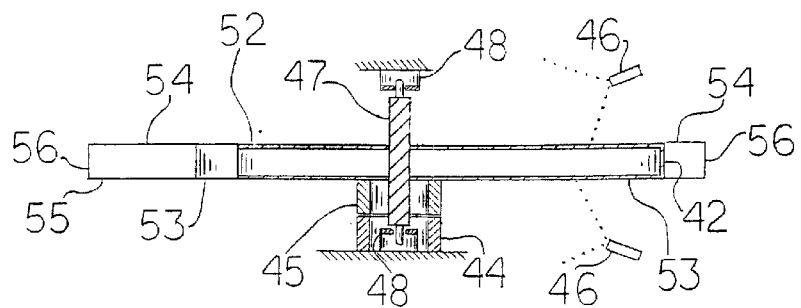

UNIVERSAL PARTICLE FLUX PRESSURE CONVERTER

BRIEF DESCRIPTION

This invention is based on a presently hypothetical Universal Particle Flux Field (UPF Field). It is necessary to understand this Field in order to understand the subject Universal Particle Flux Pressure Converter invention. This field a simultaneously convergent/divergent field *; (FIG. 1); other such fields occur in Nature and they are quite well understood. Light Photons in a closed chamber with uniformly reflecting walls produce such a flux field. Gas molecules in a partially evacuated spherical chamber can also form such field, when the mean free path of the molecules are much longer than the diameter of the chamber, and hence the molecules substantially do not collide. The motion of these molecules are perfectly random. Two neutral masses immersed in the UPF Field will develop forces between them which are consistent with Newton's Equation of Gravitation. This field is also consistent with the Electrostatic, and Magnetic Force Equations. This hypothesis also indicates why the Detectable Universe does not fall back on itself due to gravitational "attraction" **: the Undetectable Universe beyond the "edge".

* We hypothesize that most of this UPF Flux is continuously produced by Supernovae and colliding Galaxies. Black Holes continuously absorb this Flux. The rate of absorption is a function of this Flux density and the magnitude of the central mass of the Black Hole. In this manner, a relatively stable flux density equilibrium is produced in the vast expanses of the greater Universe. Saturated Black Holes explode into Supernovae.
** The Missing Mass Enigma.

A net torque should be produced in such a field, on a rotor made of flux attenuating material, if preferentially shaded with a flux attenuating stator. This principle is similar to a jet impinging on a turbine bucket-wheel (a schematic diagram is given on FIG. 3).

The central Neutron mass of Black Holes absorb the UP Flux completely. We estimated the mean penetration depth of the gravitational component of the UP Flux into a Neutron mass; we believe that this is a Universal Constant.

There are 3 distinct effects of invisible forces at a distance that this field produces: Gravitational ***, Magnetic, and Electric. We hypothesize that the Tau, Muon, and Beta Neutrinos are producing these forces respectively. We live in a sea of Neutrinos, but the Neutrinos are so elusive that we can only detect a few individual Neutrino tracks, in a Čerenkov type detection chamber; but we do see the powerful effect of the Universal Flux in Gravitational, Magnetic and Electric forces. It is also known by the direction of Neutrino tracks in the Super Kamiokonde detector, that Neutrinos traverse the mass of the Earth.

*** Linear and radial acceleration forces are closely related to gravitational forces (in a black box we can not tell them apart).

Magnetic and Electric forces are about $10^{20}$ times stronger than gravitational forces for similar size apparatus; Magnetic apparatus appeared to be more expedient to build than an Electrostatic apparatus. Gravitational UPFF Pressure Converters are not practical for Laboratory applications. Since the driving forces are expected to be in the micro Newton range, magnetic thrust bearings are used to support the rotor in the vertical direction.

BACKGROUND OF THE INVENTION

Reneé Descartes (1596–1650) emphatically believed that "the Cosmos is filled with a fluid more dense than matter, yet invisible, and it is in continuous motion" (Theory of Cosmological Impact). Descartes rejected Galileo's Pendulum and Free Fall experimental conclusions, because Galileo "failed to reduce the mathematical laws of moving bodies to their ultimate mechanism".

Galileo Galilei (1564–1642) had his manuscript of the "Two New Sciences" smuggled to France for publication in 1638. His book substantially laid the initial foundation of kinematics and the dynamics of pendulums and freely falling bodies. Galileo's Free Fall and Pendulum experiments indicated the Principle of Equivalence of inertial and gravitational masses. Nonconformist Galileo also attempted to measure the speed of light, which was "known" to be infinite by the contemporary scientific establishment (including Descartes and Kepler). Galileo used two manually operated shuttered lanterns a few kilometers apart, which of course did not work. Galileo improved the magnification of telescopes from about 3× to 30×, which greatly enhanced astronomical observation capabilities.

Olaf Röemer (1644–1710) published his work on the speed of light in 1675 by measurements of the shift in the eclipse period of the Jovian moon Io, as the Earth to Jupiter distance varied during several months. His data indicated an Earth orbital diameter transit time for light of 22 minutes; today's accepted value is about 16.6 minutes. This is an excellent value for the sighting equipment and the clocks used in his time. Röemer was using a Galileo type telescope. Röemer's data was generally ignored until the Bradley measurements of 1729 confirmed its validity.

Sir Isaac Newton (1642–1727) published the "Principia" in 1687, stating the three Laws of Motion, the Laws of Gravitation, and confirmed by pendulum experiments the Principle of Equivalence. Newton was ridiculed for some of his Laws, by his contemporaries, particularly on the European Continent.

George LeSage (1724–1803) published his paper in 1758 on the "Pushing Theory of Gravitation" by "particles ultramundanes" (out of this world particles) "raining down on us", attempting to explain the mechanics of Newtonian Gravitation. In his time it was impossible to prove that particles can traverse the mass of the Earth; today we know that Neutrinos do traverse the Earth's mass, with only minute interactions. Also, there is a serious subliminal "Freundian Aversion" to LeSage's Theory; it may be frightening to realize that billions of particles traverse through our bodies every second, with considerable mass flow rate, from every direction, and that the imbalance of this flux field due to a slight attenuation by the Earth's mass is holding us down with considerable force. LeSage also suggested that the structure of matter is held together by this "out of this world fluid". LeSage's Theory was generally ignored by his contemporaries, and it and Descartes' Theory of Cosmological Impact are rarely known in our time, even by the scientific community.

Charles Coulomb (1736–1806) with his Torsional Balance in 1784 determined that the force between charged bodies varies as the inverse square of the spacing between the charged bodies. Sir Henry Cavendish (1731–1810) in 1798, using a modified Coulomb Torsional Balance, showed that gravitational forces in space also follow the inverse square law. Ever since then, some scientists theorized that all "invisible forces at a distance" are closely related. Cavendish was also the first to measure the Universal Gravitational Constant "G" in Newton's Equation of Gravitational Forces.

Albert Michelson (1852–1931) measured the speed of light in the direction, of the Earth's orbital velocity vector (~30 km/sec.) and orthogonal to it, which measurement he thought to have had ample accuracy, and found no difference in the speeds. The Michelson-Morley experimental results were published in 1887, indicating that the long theorized Stationary Luminoferrous (light carrying) Ether Field has no effect on the speed of light propagation. Michelson used a reflective optical interferometer of his design to measure the speed of light. James C. Maxwell (1831–1879) was one of the major proponents of a Michelson-Morley type experiment. On the basis of this experiment, the scientific community generally concluded that "therefore no Universal Field of any kind exists" (gravitational, magnetic, nor electric). Eventually, the advocates of the "Principles of Virtual Reality" triumphed. Ironically, Michelson despised this conclusion and clung to his belief to the end of his life in "my beloved Ether, although they tell me that it does not exist". The only valid scientific conclusions that can be drawn from the Michelson-Morley Experiments are that the Universal Ether Field either does not interact with streams of photons (and does not carry light) or that the interaction was beyond the detection capability of the subject instrumentation. The Michelson-Morley Experiments most certainly did not prove that no Universal Field of any kind can exist.

Hendrik Lorentz (1853–1928) also theorized that a Stationary Ether Field that permeates space and matter exists, and showed mathematically that effects of the Earth's "Ether Wind" on the speed of light are negated by the changes in length of the optical platform due to the "Ether Wind" (Theory of Contraction). A few eminent scientists around the turn of the century believed in the existence of some type of "Universal Ether Field"; among them were: G. G. Stokes, J. H. Poincare, J. Larmor, A. J. Fresnel, G. F. FitzGerald, Lord Kelvin, Lord Raleigh, and J. Mac Culagh.

Albert Einstein (1879–1955) published his work in Photo Electricity in 1905, expounding the particle (Photon) nature of light. Using his newly developed "General Theory of Relativity", he predicted in 1917 that a light beam traversing in the vicinity of the Sun will be deflected by 1.75 seconds of arc. Sir Arthur Eddington verified Einstein's prediction by measurements at a total solar eclipse in 1919. This prediction has been verified many times since then. Einstein was the first to theorize an anti-gravity like force that is expanding the Universe, keeping the Universe from falling in on itself due to gravitation (Cosmological Constant). Later he re-canted this theory, and said that "this was the greatest blunder of my life". Einstein attempted to write one Unified Field Equation (for Magnetic, Electrostatic, and Gravitational Forces), for the rest of his life without success.

Ellis and Wooster (1927) using a very sophisticated calorimeter showed the energy release per Electron or per β emission of radioactive matter is less than ½ of the energy of the spectrum. This presented a serious problem to Nuclear Physics.

Wolfgang Pauli (1900–1958) disclosed his theory in 1930 on the release of a particle he called Neutron for every Electron emitted, to maintain the energy balance of β emission. Pauli's disclosure occurred before Chadwick discovered the Neutron in the nucleus. Pauli postulated that the detection of this particle is extremely difficult due to its extremely small interaction cross section ($\sigma \sim 10^{-15}$ cm$^2$). To end the confusion Enrico Fermi renamed Pauli's particle "Neutrino". Clyde L. Cowah Jr. and Frederick Reines succeeded to detect Neutrinos in 1956, using a "very large" tank of hydrogenous scintillator exposed to an "enormous" flux of Neutrinos emitted from fission induced β decays in a nuclear reactor. In spite of this enormous Neutrino flux, less than 1 scintillation per minute was expected.

The first Nuclear Bombs were exploded in 1945; these events are characterized by the output of huge amounts of Photons, Neutrons, Electro-Magnetic Waves, and X-rays, and very likely other yet unknown, hard to detect particles.

Binary Neutron stars were discovered in the 1950's; some of these stars are believed to radiate as much Gravity Wave energy as the total radiant energy of our Sun. The existence of Black Holes were also theorized recently. It is generally believed that there is enough compacted Neutron mass at the center of a Black Hole that light (Photon Flux) can not escape. Stephen Hawking believes Black Hole masses can be as small as a few centimeters in diameter; others think it is many kilometers.

In the 1950's Joseph Weber started work to isolate Gravity Waves by inducing and detecting resonances in "large" elastic masses. caused by Gravity Wave Pressure, from specific sources. Einstein predicted "a small ripple in the gravitational field" from these sources, "which (wave) also travel at the speed of light". Weber's reported results, however, could not be repeated by others. At this time a "huge" Einstein/Michelson type experimental apparatus is being constructed with 2.5 mile long orthogonal tubes to detect Gravity Waves, and to measure the speed of light in vacuum.

M. Nieto of LANL. and J. D. Anderson of JPL published a paper in 1998, proclaiming that their 18 year study of satellite orbits indicate that the Newtonian gravitational force equation with the Einsteinian correction, needs further correction in the range of $+10^{-10}$ Newtons. A corresponding increase of "G" during the 18 year experiment could explain this anomaly.

Supernovae or exploding stars were observed in 1054 (remnanat is the Crab Nebula), Tycho's Nova in 1572, and Kepler's Nova in 1604. The number of known Supernovae is now over 140. Recently two Supernovae were observed to be "hurling away from each other" near the edge of the detectable Universe, suggesting gravitational repulsion. Supernovae are characterized by the immense output of Photons and Radio waves. S. Woosley of the University of California reported that that bursts of Gamma rays were observed (on Apr. 25, 1998) emitted from a Supernova; "such bursts occur, on the average, once a day in the observable Universe". Radio wave output continues long after the Nova is dark.

The prevailing opinion of the scientific establishment in our time is, that no humanly comprehensible mechanical model of the Universal Field can exist, only mathematical solutions are possible. Lately a few investigators are re-visiting this belief, since no significant experimental nor analytical progress has been made in this field for decades.

As we can see, over the centuries an unknown Particle Flux Field has been proposed by a multitude of outstanding scientists to explain "invisible forces at a distance". Only in relatively modem times did we generally give up the idea (Michelson-Morley Experiments). At the same time our understanding of Gravitation has remained stagnant compared to most other fields of science. We believe that we should re-visit the "unknown" particle idea; and we can already see some new insights as to how the Universe works, based on recent new astronomical observations, that our predecessors did not have. For example Supernovae appear to repel each other, also Supernovae and Black Holes appear to be the major sources and sinks for this "unknown" particle respectively. When Black Holes absorb a sufficient number of these particles they become super critical and explode to become Supernovae. Colliding Galaxies can also become Supernovae of another type (Quasars).

DISCUSSION

The characteristics of the Universe is such that "flux fields" are produced by various particles moving randomly in every direction. Gas molecules form such flux fields, with mean free paths between collisions of various lengths, depending on the gas pressure and other properties of the particular gas. Photon flux fields are produced by a light source in a reflective enclosure, with relatively long mean free paths and with no apparent interaction between Photon streams (light beams). These flux fields are simultaneously convergent/divergent (see FIG. 1). It is proposed that another particle flux field exists in the Universe, similar to the Photon Flux field, except the particles producing it are orders of magnitude smaller in cross section than Photons, and they are many orders of magnitude more energetic than Photons. This flux field penetrates matter and space, with generally small interactions (except at Black Holes and Supernovae), the flux streams are directed in every direction from any point to every other point in the Universe. These "Universal Particles" have some properties much like that of Neutrinos, except that they must have mass and they must occur in flux densities much larger than it is now believed for Neutrinos. The order in this Flux Field is a nearly perfect disorder, which is an order in itself. It is further proposed that all gravitational, inertial, magnetic, electrostatic, and electro-dynamic forces are manifestations of matter interacting with the Universal Particle Flux Field. In the simplest model the Flux Field is the same for all invisible forces at a distance, only the magnitude of the attenuation (or force) is different, depending on the type of matter penetrated, i.e. neutral, charged, or magnetic matter. We suspect that inertial forces are also a manifestation of an accelerating body interacting with the Universal Flux Field, and the Principle of Equivalence of inertial and gravitational masses are a result of this common Universal Flux Field.

The inventors of the subject device humbly submit that the "invisible forces at a distance" can not occur without a particle interchange! How else can a body of matter "know" that another body of matter is in existence anywhere within light years, and what some of their specific characteristics are respectively? Clusters of Stars (Galaxies) with light years in diameter were observed to revolve around a center point (Black Hole). We do not know most of the properties of this Universal Particle Flux Field; such as mass/masses of these Particles, cross section/sections, mean free path/paths, number of particles per unit volume, the velocity spectrum, the oscillation frequency spectrum of a stream of Particles, and how many species of Particles are involved. All we know is an average value of the Universal Gravitational Constant "G" to only 3 significant figures, and that the mean free path of these Particles in vacuum, must be measured in millions of light years, from astronomical observations of Galaxies.

When these Universal Particles, henceforth called "Unitons", interact with neutral matter (non magnetic and uncharged) they are called "Gravitons". Gravitons exert a force on the nuclear structure of the atom at impact. The Graviton streams or flux apply force on a body; the attenuation of the stream and the force produced are approximately proportional to the mass density and the volume traversed (total mass). Two masses appear to attract each other by the shadowing of the graviton flux produced on each mass, by the other mass respectively.

We have expressed this "Uniton Flux Field" (UFF) mathematically as a power series. The first term is the Newtonian Field; it implies a linear attenuation as a function of masses. The subsequent higher order terms define the non linear attenuation of the UFF in matter (see Detailed Description). When these particles (Unitons) traverse matter made up of magnetic dipoles or charged bodies, the Uniton Flux attenuation, hence the force exerted on these bodies, are many orders of magnitude larger than for a neutral mass. For the above reasons it appears that a magnetic or electrostatic device would be much more cost effective to build, compared to a gravitational device, to experimentally prove the Brainard-Ney Uniton Flux Field Theory.

All of the above forces have a similar field distribution for similar geometry's such as in the vicinity of a point, a wire, or a plate. The magnetic and electrostatic forces, however, are orders of magnitude larger than gravitational forces on a laboratory scale. For example: comparing a 1 kg mass to a 1 coulomb charge, the electrostatic forces are about 20 orders of magnitude larger than the gravitational forces. For the purposes of the "Shaded Rotor Device", however, it is inconsequential if the Unitons causing gravitation, magnetic or electric forces are all of the same species, or three different ones. If there were three different Universal Particles, the theory would be much more difficult to understand. If indeed the same specie of particles cause all force field phenomena, "strong" magnetic or electrostatic fields should produce observable gravitational effects. Recently, there have been some publications indicating such observations.

To explain repulsion between like charges or like magnetic poles, the Upiton streams traversing it are not only attenuated, but are also ⅔ fractionally polarized. The result is that the polarized Uniton streams from one charged body exert a thrust on another similarly charged body. These polarized Uniton streams suffer less attenuation than un-polarized streams traversing another oppositely charged body. The magnetic phenomena is characterized by a similar mechanism.

Assuming that this Uniton Flux Field exists, one should be able to extract slight amounts of energy, on a laboratory scale, by various devices to prove the UFF Theory. One device is a shaded rotor apparatus, where a low friction rotor is totally enclosed in a UFF attenuating shield, except a narrow slit directed at the rotor rim is provided. Neutral matter may be used for the shade and the rotor; however, magnetic or electrostatic devices are much more cost effective to build. Slender magnetic bars and a magnetic rotor are used in the subject device, for reasons of expediency. In other devices disclosed herein electro-staticly charged stators and rotors are used.

We have shown that the mean penetration depth "$L_0$" of the UFF in compacted Neutrons, multiplied with a totally compacted Neutron density "$\rho_0$" is in the exponent of the exponential attenuation which we represent as a power series expansion for a neutral mass. We believe that it is a Universal Constant, but its value is yet unknown, although we have estimated its value (see Detailed Description). We expect that the subject device will determine this value, from the torque on the rotor and from other known parameters of the device.

We propose that the relatively uniform gravitational field in our Solar System is brought about by the dispersion of Supernovae (major source of Uniton Flux) and a dispersion of Black Holes (major sink of the Uniton Flux). The dispersion (see FIG. 5) is brought about by the Supernovae which tend to push away all other masses by their high energy divergent Uniton Flux. In addition an equilibrium is reached at some Flux level between the source and sink of the Uniton Flux, since the rate of the Uniton flux absorption by the Black Holes is a direct function of the Flux density. This relatively stable equilibrium is indicated by the stability of the Universal Gravitational Constant "G", in our Solar System. Moreover, new Black Holes are constantly being formed by Uniton mass and heat energy is being continuously absorbed by large celestial bodies, and they eventually become super-critical and explode into Supernovae. S. Woosley of the University of California (at Santa Cruz) stated that a Supernova emitting Gamma rays was observed on Apr. 25, 1998, and such emissions were observed daily by satellites for the last 25 years but until now the source was an enigma. This indicates that there should be ample Uniton Flux produced in the Greater Universe to provide a relatively uniform Universal Flux Field in vast regions of the Detectable Universe.

Supernovae are disappearing because they are highly transient in nature compared to the age of the Universe. Although, Supernovae and Black Holes are the major sources and sinks of the Uniton Flux in the Universe, of course, all stars and probably all nuclear reactions contribute to the generation of the Uniton Flux Field, and all masses adsorb some of the Uniton Flux. In this way, relatively uniform Uniton Flux Fields are formed over vast regions of space, inside and outside of our detectable Universe. At this time there are about 140 known Supernovae in our Detectable Universe.

Our Universe is defined as the boundary formed by faintest electromagnetic images that our best instruments can resolve. Our Detectable Universe expands as our instrumentation sensitivity improves. It has "expanded" by about 7 billion light years in the last few years. We are near the center of Our Universe only because our position and visibility substantially defines the borders of Our Universe. The "single" Universe attitude conforms to the historical precedent: "if we can not see it or detect it, it can not possibly exist"."Our Own Single Big Bang" theory has the semblance of the "Geocentric Solar System" concept. There must be a large array of Supernovae and Black Holes beyond our Detectable Universe, to produce a relatively uniform Uniton Flux Field, in Our Universe.

Einstein was the first one to propose that there has to be a gravitational repulsive force in the Universe so that it would not fall back on itself due to gravitational attraction. He later recanted this theory, and said that "this was the greatest blunder of my life". It now appears from astronomical observations, that two Supernovae (exploding stars) are hurling away from each other, near the edge of the visible Universe, at a much faster rate than could be expected from the "Theory of the Expanding Universe".We believe that the Supernovae are repelling each other, by emitting Uniton Flux toward each other. If the Supernova is ejecting Unitons at a higher rate than its mass is absorbing the Universal Uniton Flux, a net repulsive field would exist in the vicinity around such Supernova. As the distance from the Supernova is increased, the net repulsive force drops substantially as the inverse square of the distance. At a sufficient distance from the Supernova, the nominal UPF Field dominates. This hypothesis explains the "Missing Mass Enigma" at the edge of our detectable Universe. The Ultimate Universal Conservation Law may very well be the conservation of Unitons.

It is noted that nuclear bomb explosions are associated with considerable Photon, X-ray, and Electro/Magnetic Wave emissions. We believe that the "E/M Wave" emissions indicate Uniton emissions, but gravitational effects associated with the emissions of Uniton Flux is expected to be many orders of magnitude lower in detection level than the electromagnetic effect ($\sim 10^{-20}$), and hence it would be extremely difficult to resolve.

The Universal Gravitational "Constant" does not appear to be constant, by the best data obtained from the latest and most sophisticated instruments. It varies by about 1 part in 1000, which makes it about the least accurately known Physical Constant in contemporary physics. A paper has been written by an MIT scientist, proposing that all of the measurements are indeed correct, and "G" is direction variable. The subject measurements were made at various locations on Earth; the sensitive axes were not coordinated, and hence, these instruments scanned various regions of the Universe as the Earth turned. The attenuation of the Uniton Flux Field by intervening matter in the Universe must also be considered.

We further propose that "G" is also time variable, and a rapid magnitude and direction variation exists when Supernovae occur in the vicinity . This could explain the demise of large heavy creatures (Dinosaurs) and not the relatively small light ones. If the Universal "G" hence "g" of the Earth has increased by a few percent, and since weight is a function of the linear dimensions cubed, while stresses are a function of the linear dimensions squared. It can be seen that the curves diverge rapidly as the linear size is increased, and the critical structural support members of "large" bodies will fail in stress as the "G" is increased, sooner than that of relatively "small" bodies. Conversely, according to the most accepted hypothesis of the "sudden" demise of Dinosaurs, consider this: if the Sun were blocked out for a few years by dust from a large Meteorite impact, there would have been no vegetation to maintain the food chain for any of the critters, large or small! Moreover it has been calculated that the Pterodactyl (Jurassic/Mesozoic flyer) could not fly under the present conditions on Earth. A significantly lower "G" in the above period would explain this enigma. Also, the "g" of the Earth might have increased significantly due to the adsorption of Uniton mass, during the existence of Dinosaurs (several hundred million years). Recent findings indicate that the Dinosaurs started dying out millions of years before the famous "Cataclismic Giant Meteorite Impact", and some Dinosaurs existed several million years after it.

A non uniform or highly directional increase of "G" occurs due to a Supernova relatively "close" to the Solar System, relative to the dispersion of Supernovae. In this case the entire Solar System is accelerated in unison in the direction away from this Supernova. The Earth orbit around the Sun would not change due to a uniform increase of "G", due to the Principle of Equivalence. The inertial resistive forces on the Sun and on the Planets are probably produced by crossing the perpendicular components of the Universal Flux Field; the details of this phenomena is not understood.

It has been proposed by a number of investigators, that in order to explain the existence of Galaxies near the outer edges of our Universe, significant amount of mass must be present just outside of the visible Universe: the "Missing Mass Theory". The existence of a multitude of other Universes bordering "our own detectable Universe", would provide the missing mass. The rotation and flatness of the Galaxies can also be explained by self shading of the UFF. Slight asymmetries in mass will accentuate these asymmetries by the effects of shadowing.

One stated objection to the existence of the proposed Uniton Flux Field is that allegedly the sensitivity of the Earth's "g" measuring instrumentation is such, that it would pick up a 12 hour maximum to minimum variation, as the Earth rotates and the sensitive axis of the instrumentation is rotated 180 degrees relative to the Earth's orbital velocity vector around the Sun, (~30 km/sec). Although the Uniton Flux itself may travel at the speed of light, the vector sum of the velocities of the total Flux Field is substantially zero. So that sufficiently sensitive instrumentation should pick up the +/−30 km/sec variation in a 12 hour period. This variation has never been observed and published in the literature, as far as we know.

Momentum transfer by the attenuating flux due to internal collisions produces force on a mass. For a single mass in the Uniton Flux Field, however, there is no net force since the sum of the forces is zero and hence no mechanical energy is extracted from this configuration. Energy of course can be extracted temporarily, from a two mass system if they are spaced apart, so that they can do work as they are being pushed together by the UFF. Energy may be extracted continuously from the UFF, if a proper impedance configuration is utilized, such as our Shaded Rotor device. It may be a neutral mass or gravitational device, which has been calculated to be too large for a laboratory apparatus; or it may be a magnetic or electrostatic device, which are suitable for laboratory use. In addition to momentum transfers of the flux field to the mass, heat is also generated. This UFF heating of the interior of the Earth may contribute to keeping the core temperature substantially constant.

It is of interest to note that in 1905 Einstein calculated the deflection of a light beam (Photon Flux) grazing the surface of the Sun, using Huygens' light wave equation. His result was 0.83 seconds of arc. We calculated the deflection of the path of a mass at the speed of light grazing the surface of the Sun to be 0.86 seconds of arc, using pure Newtonian mechanics. Einstein later calculated this deflection using his General Theory of Relativity, and predicted a value of 1.75 seconds of arc. The Eddington measurements of 1919 indicated a value of 1.7 seconds of arc (~2× of the above values), this value has been subsequently confirmed many times. We have discussed our idea that Unitons explain Gravity and Electro-Magnetic fields; since Light (Photon flux) consist of Electro-Magnetic fields an interaction is not surprising.

A recent study of 3 satellites (Pioneer 10 & 11, and Ulysses) in Solar orbit over an 18 year period, by M. Nieto of LANL. and J. D. Anderson of JPL., indicated an anomaly in their actual positions and the calculated positions by the Newtonian Equation with Einsteinian corrections, in the parts per $10^{10}$ range. It appears that the Sun is "tugging" at these satellites more than expected. Newton's Equation of gravitation is a first order equation, it implies a linear attenuation of Graviton Flux traversing matter. Our second order (negative) term, results in a lower force than that of the Newton's Equation of gravitational force. Orbiting satellites integrate the deviation from actual to calculated positions over a time period, this is the most sensitive method of testing Newton's Equations and the Principle of Equivalence. As far as we know, the Universal Gravitational Constant is not known out to 10 digits, and it appears to be direction and time variable after the $3^{rd}$ digit.

Figure 7:
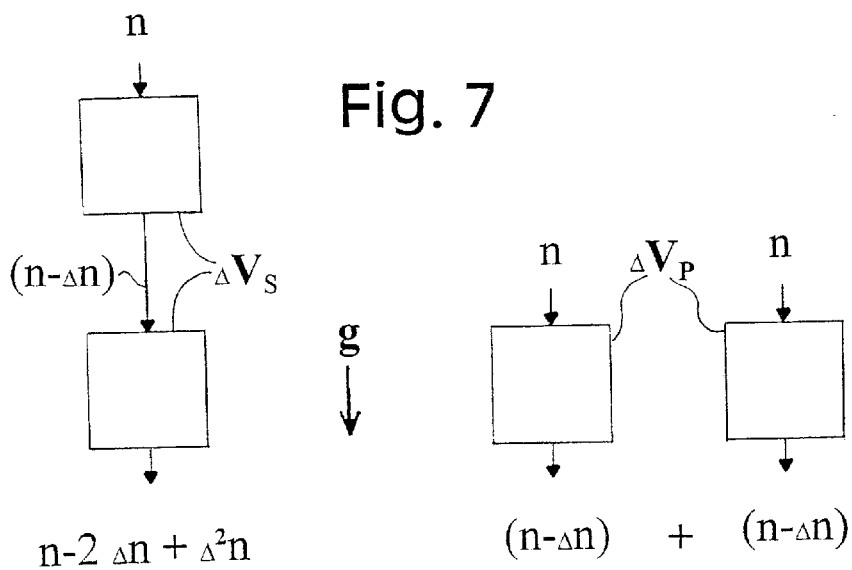

Photon beams are sensitive to absorption and are scattered by Cosmic dust, and this causes a "red shift" in addition to the possible Doppler shift to red. We believe that the Uniton Flux is substantially un-affected by Cosmic dust. A lower "G" should also cause a "red shift", as it will be shown later in this paper. Also it is stipulated that the Uniton Flux Uniton Flux is much more energetic than the Photon Flux that we normally encounter, since gravitational, electrostatic, and magnetic forces are many orders of magnitude greater than the force produced by light pressure in the Universe. For these reasons the is expected to traverse many orders of magnitude greater distances than Photon Flux. There are localized perturbations in the Uniton Flux Field, due to the variation in Uniton Flux attenuation in parallel and in series modes of traverse of masses, as indicated in FIG. 7. Binary Neutron Stars would attenuate the Universal Uniton Flux Field accordingly. We are detecting this variation, as they rotate around each other, as modulated Electro-Magnetic Waves; Gravity Waves would be extremely difficult to detect directly since their relative energy level is about $10^{-20}$ that of electromagnetic waves. Since Neutron Stars are so tremendously massive, even the second order effects would be quite considerable. Of course, in the vicinity of Supernovae and Black Holes there are tremendous gradients in the Uniton Flux Field, but by in large at sufficient distance from these sources and sinks, the average "G" is quite constant in every direction. The key to understanding the Grand Universe is not the Light and Radio Flux Field alone, rather it is in conjunction with the Uniton Flux Field!

A number of similar properties indicate that the Neutrino may be the Uniton Flux Particle, however we only detect a very few Neutrinos in the Čerenkov Detectors compared to what should be expected if the Neutrino Flux and the Uniton Flux were one and the same. There are a number of hypotheses in the literature why the Čerenkov Neutron Detector appears to be so notoriously inefficient to detect Neutrinos. One textbook hypothesis is this: if a Neutrino collides with an anti-Neutrino in the detection chamber, the event would take place at a point within the media in the detection chamber where the Čerenkov Light can be produced. Collision of Neutrinos with anti-Neutrinos is expected to be an extremely rare occurrence. Another scenario is that normally the Neutrino impact forces on an orbiting ($H_2$) Electron are relatively uniform, with a net force vector directed toward the Nucleus, due to flux attenuation by the Nucleus. At some rare instances, due to small sample statistics, several highly energetic Neutrino Flux streams can combine with vector sums in the tangential direction, this can momentarily shift the radial force vector significantly and dislodge the Electron from orbit, and hence a light flash is produced. Yet another scenario is that Neutrino to Neutrino collisions will produce Čerenkov Light, and this would again be an extremely rare event, considering the estimated cross section of the Neutrino of about $10^{-45}$ cm². For comparison the Thompson free Electron cross section is 6.65×$10^{-25}$ cm². We also know that the mean free path of the Unitons must be measured in Galactic dimensions, so that a collision of Neutrinos in a relatively miniscule chamber must be relatively rare, even at "extremely high" Neutrino volumetric densities. The water chamber Čerenkov Detector is not sensitive to Tau Neutrinos at all, only heavy water (Deuterium Oxide) filled Čerenkov Chambers will detect Tau Neutrinos. The Tau Neutrino Flux energy coupling to the plain water $H_2$ Electron may be too low to dislodge an Electron. In the first 18 months of operation the Super Kamiokande chamber detected only about 5 useful Beta and Muon Čerenkov Light Cones entirely contained within the chamber, per day. It is also noted that there is no preferred orientation of the Čerenkov Light Cone in any of the operating chambers around the Earth, except in the direction of the Sun, as far as we know.

In order to determine if the Neutrino Flux can be the Uniton Flux, the following experiment may be performed: Use a Cavendish type torsional pendulum (see FIG. 15), with one of the masses exposed at close range to an intense flux density Beta/Neutrino source (from a nuclear reactor), with a Beta shield between the source and the masses. A similar experiment can be used with a Coulomb type Torsional Balance, with a highly charged sphere on one end of the rotatable beam, exposed at close range to the intense source of Neutrino Flux. The single charged sphere should preferably be of a hollow thin wall metallic construction, with polished outside surfaces. Enclosure into an evacuated chamber is ideal for eliminating forces on the pendulum due to air currents, the vacuum chamber will also greatly improve the voltage "hold-off" capability of the electrical insulation. All components should be made of non-magnetic materials in order to eliminate interactions with the magnetic field of the Earth. Optical window ports are provided for the laser beam entrance and exit region. Vibration isolation spring/mass/damper system should be used at the suspension point of the filament. The force on the charged sphere due to the "mirror image charge" on the Beta shield can be negated by the proper bias voltage on the Beta shield, before the Beta/Neutrino source is activated. It is possible that the interaction cross section of the Neutrino is many orders of magnitude larger traversing a charged mass compared to a neutral mass. If sufficient momentum transfer takes place to indicate a credible deflection of the instrument, then it is indeed possible that the Neutrino is the Universal Particle.

These devices are similar to the Shaded Rotor devices (pivoted rotors could also be used in these experiments), where we are shading the natural background of particles on one side of the rotor. Instead we are using a man made source of particles to irradiate a mass on one side of an ultra sensitive Torsional Balance, to overcome the natural balanced background.

The possibility that the three types of Universal Neutrino Flux Fields namely: Beta, Muon, and Tau, are identical to Universal Electrostatic, Magnetic, and Gravitational Force Fields respectively, must not be overlooked. The Beta Neutrino is associated with an Electron emission, so that it may be responsible for Electric Fields. The Tau Neutrino appears to be the least energetic of the three types of Neutrinos, so that it may be responsible for the least energetic of the three Force Fields, namely the Gravitational Fields. By the process of elimination the Muon Neutrino should be responsible for the Magnetic Fields.

In order to determine if the Beta Neutrino will not have a momentum transfer to a magnet larger than what is expected for a neutral mass (only the Muon Neutrino has this ability, according to the above "Theory of 3 Independent Force Fields"), the Torsional Balance is provided with a bar magnet (see FIG. 16). The same non magnetic chamber used for the electrostatic experiment, may be used for this magnetic experiment. The bar magnet preferably should be of the "high-tech" Rear Earth type with relatively high Uniton Flux impedance to weight ratio.

The Universal Particle Flux Theory may provide a physical model for Quantum Mechanics. On the atomic scale we expect a fluctuation of the particle (quanta) stream of the Universal Flux Field, but on a larger scale, like the Solar System, these fluctuations average out so that they are not detectable. The electrons orbiting the Nucleus smear out like a cloud due to the fluctuating field. The orbits would become bands much like what we believe occurs as described by quantum mechanics models. This leads to the conclusion that at higher or lower Uniton Flux Fields or "G" Fields (many light years away) we could have smaller or larger volume for the Elements respectively, and these "different" Elements are expected to have different properties, than those in our Uniton Flux Level. These "different" Elements could play a role in the well known "Red Shift Theory" of Star Light; the Bohr Model of the Atomic Structure indicates that at lower Electric Fields (lower Uniton Flux), the electron orbital energy levels decrease and the light output shifts toward the red. This line of thinking inevitably leads us to the conclusion that the volume of matter is a function of the magnitude of the "G" Field it is immersed in! This indicates a larger Earth diameter at the hypothetical lower "G", during the existence of Dinosaurs, which reduced the "g" further on the Earth's surface, due to the larger distance from the center.

We realize that this line of thinking would totally change our understanding of the mechanics of the Universe.

The scientific community should place significant effort on measuring the Uniton Mass Flow Rate per Unit Area in one direction along one Axis (at a time), and measure the Velocity Spectrum of the 3 Neutrino Flux Streams.

MATHEMATICAL TREATISE

The mathematical derivation of how the random Uniton Flux Field can produce gravitational, magnetic, and electrostatic forces is discussed below. For gravitational forces, it is proposed that the force on a mass is determined by the absorption and scatter of this particle flux as it traverses through that mass from every direction; and a net force is produced when there is an imbalance of the particle flux impinging on the mass. This imbalance is generally due to the presence of another mass "shadowing" the first mass by particle flux attenuation. A gradient of the Uniton Flux Field on a universal scale should also generate a force on stars, and perhaps explain the expanding Universe.

In addition to deriving the Newtonian Gravitational Theory, the derivation based on the Uniton Flux Field Theory results in certain subtleties that are not present in the Newtonian Theory. These second order effects are the reasons that a mass Shaded Rotor device will work, and the magnitude of these effects can be estimated. The same second order effects also explains the rotation of a magnetic or electrostatic "Shaded Rotor".

Uniton stream attenuation within a mass can be defined as $e^{\wedge}(-\rho L/\rho_0 L_0)$, where $\rho$=density of the mass, L=path length that the particles traverse in the mass, and $\rho_0 L_0$ is the Characteristic Attenuation Constant. When $\rho L=\rho_0 L_0$, the attenuation is 1/e. It appears that $\rho_0 L_0$ must be quite large and is nearly equal to the density of a neutron at $10^{15}$ grams/cm$^3$ (the greatest density we know) times the mean penetration length $L_0$=1 km (several units of $L_0$ is the estimated radius of a Black Hole which we believe completely absorbs the Uniton Flux traversing it); therefore $\rho_0 L_0$ must be on the order of $10^{20}$ grams/cm$^2$. In the central region of a large enough neutron mass, where the Uniton Flux Field is completely absorbed, the Universal Gravitational Constant "G" is zero, and the so called "gravitational attraction" ceases to exist. However, the pressure developed by the outer layer neutrons interacting with the Uniton Flux Field holds the inner core of neutrons together. There is a maximum magnitude of gravitational force in the Universe, which is a function of the magnitude of the Uniton Flux Field, and the maximum gravitational force is independent of the magnitude of the mass density.

Figure 8:
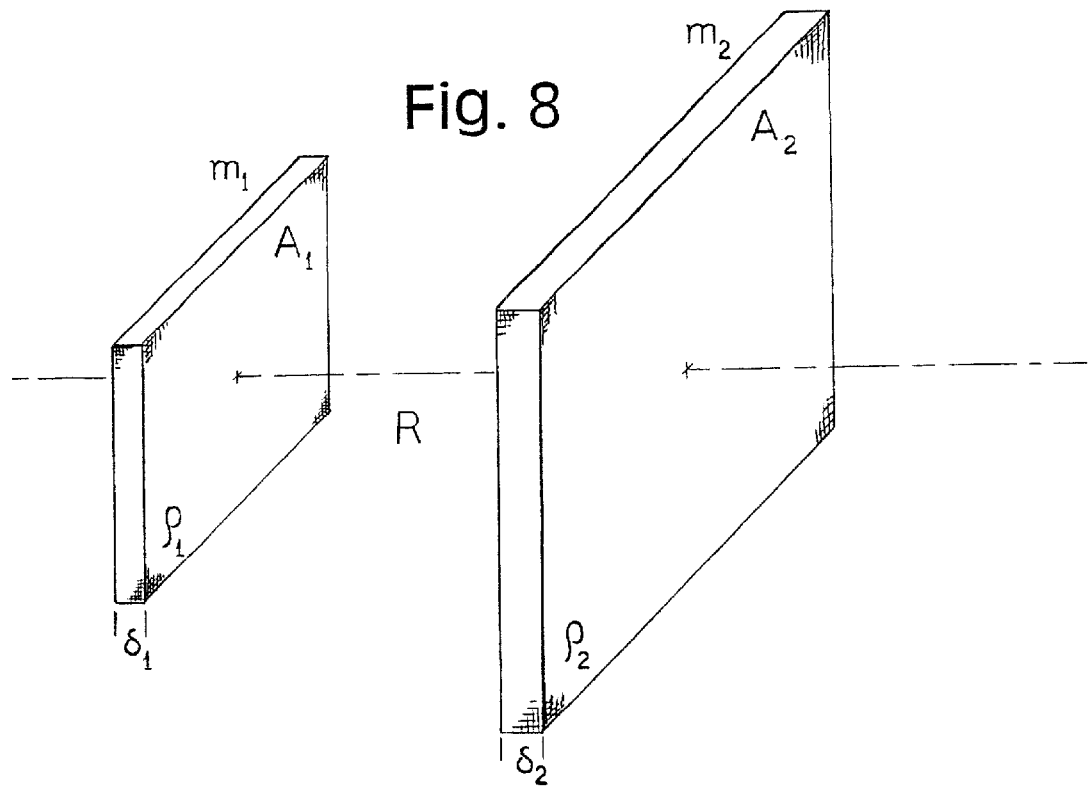

In order to show the derivation of the Uniton Flux Field Theory, a simple example is shown (see FIG. 8). Two parallel plates are shown, with masses $m_1$ and $m_2$, areas $A_1$ and $A_2$ densities $\rho_1$ and $\rho_2$, and thickness $\delta_1$ and $\delta_2$ respectively, with spacing R between them:

$$\text{Force} \atop (\text{on } m_1) =$$

$$k \int \int \left(1 - e^{\frac{-\rho_1 \delta_1}{\rho_0 L_0}}\right) e^{\frac{-\rho_2 \delta_2}{\rho_0 L_0}} \, \vec{d\Omega} \cdot \vec{dA_1} \hat{a}_\Omega - k \int \int \left(1 - e^{\frac{\rho_1 \delta_1}{\rho_0 L_0}}\right) \vec{d\Omega} \cdot \vec{dA_1} \hat{a}_\Omega,$$

where $$\left(1 - e^{\frac{-\rho_1 \delta_1}{\rho_0 L_0}}\right)$$

is the absorption of the Uniton Flux in $m_1$, $$e^{\frac{-\rho_2 \delta_2}{\rho_0 L_0}}$$

is the attenuation in $m_2$, $\overrightarrow{d\Omega}$ is the differential solid angle from particles traversing $m_2$ onto the surface area of $m_1$ facing $m_2$ in the direction of the particle flux, $\overrightarrow{dA_1}$ is the differential surface area of $m_1$, facing $m_2$ (The vector direction is normal to the surface), $\hat{a}_\Omega$ is the unit vector in the direction of $\overrightarrow{d\Omega}$, the direction of the particle flux, and R is the distance between the centers of mass of $m_1$ and $m_2$.

The subtracted term is from a virtual $m_2$, at a position—R from $m_1$, where there is no attenuation by $m_2$. In this way the balance of the particle flux through $m_1$ is taken into account. It is assumed that, for the moment, the Uniton Flux is impinging upon $m_1$ uniformly in all directions, except for those attenuated by traversing through $m_2$.

The force equation can then be rewritten as:

$$\overrightarrow{Force}_{(on\ m_1)} = -k \int\int \left(1 - e^{\frac{-\rho_1\delta_1}{\rho_0 L_0}}\right)\left(1 - e^{\frac{-\rho_2\delta_2}{\rho_0 L_0}}\right) \overrightarrow{d\Omega} \cdot \overrightarrow{dA} \hat{a}_\Omega. \quad \text{Equation 1}$$

$$1 - e^{\frac{-\rho_1\delta_1}{\rho_0 L_0}} \text{ and } 1 - e^{\frac{-\rho_2\delta_2}{\rho_0 L_0}}$$

can be expanded into the following series:

$$\frac{\rho_1\delta_1}{\rho_0 L_0} - \frac{1}{2}\left(\frac{\rho_1\delta_1}{\rho_0 L_0}\right)^2 + \frac{1}{6}\left(\frac{\rho_1\delta_1}{\rho_0 L_0}\right)^3 \ldots, \text{ and}$$

$$\frac{\rho_2\delta_2}{\rho_0 L_0} - \frac{1}{2}\left(\frac{\rho_2\delta_2}{\rho_0 L_0}\right)^2 + \frac{1}{6}\left(\frac{\rho_2\delta_2}{\rho_0 L_0}\right)^3 \ldots.$$

Because $\rho_0 L_0$ is so large, the first order term in the product of these expansions is a very good approximation of the exact value, i.e., $$\frac{\rho_1\delta_1\rho_2\delta_2}{(\rho_0 L_0)^2} = \left(1 - e^{\frac{-\rho_1\delta_1}{\rho_0 L_0}}\right)\left(1 - e^{\frac{-\rho_2\delta_2}{\rho_0 L_0}}\right).$$

The Force Equation for the first order term then becomes (from Equation 1):

$$\overrightarrow{Force}_{(first\ order)} = -k \int\int \frac{\rho_1\delta_1\rho_2\delta_2}{(\rho_0 L_0)^2} \overrightarrow{d\Omega} \cdot \overrightarrow{dA_1} \hat{a}_\Omega. \quad \text{Equation 2}$$

If we assume $R \gg \sqrt{A_n} \gg \delta_n$ where $n=1$ and 2, then the Force Equation becomes:

$$\overrightarrow{Force}_{(first\ order)\ (on\ m_1\ on\ axis)} = \frac{-k}{(\rho_0 L_0)^2} \int\int dm_1 dm_2/R^2, \text{ since } d\Omega = dA_2/R^2.$$

This is exactly Newton's Law, where the Universal Gravitational Constant is:

$$G = k/(\rho_0 L_0)^2 = 6.67 \times 10^{-8} \text{ dyn cm}^2/\text{gram}^2, = \text{and}$$

$$k = 6.67 \times 10^{32} \text{ dyn/cm}^2, \text{ since } \rho_0 L_0 \tilde{=} 10^{20} \text{ gram/cm}^2.$$

One can think of "k" as the maximum pressure obtainable by the Uniton Flux Field, which is also capable of forming "Neutron stars" by compressing Neutrons to a closed packed structure. The Uniton Flux streams are completely absorbed in a few path lengths ($L_0$) of traverse in the Neutron mass of a Neutron star, and the flux streams directed toward the central region do not exit it. This means that the mass will eventually increase to a "Black Hole" mass. One can also think of "k" as the product of the Uniton flux density and momentum.

The second order force term in the product of the two series expansion is:

$$\overrightarrow{Force}_{(second\ order)\ (on\ m_1)} = \quad \text{Equation 3}$$

$$\frac{k}{2} \int\int \left[\frac{\rho_1\delta_1(\rho_2\delta_2)^2}{(\rho_0 L_0)^3} + \frac{\rho_2\delta_2(\rho_1\delta_1)^2}{(\rho_0 L_0)^3}\right] \overrightarrow{d\Omega} \overrightarrow{dA_1}.$$

The effect of this secondary term is to slightly reduce the force from the first order term, resulting in a slightly less Uniton Flux attenuation or slightly more Uniton Flux transmission. If $\delta_2$ of $m_2$ was very large (hundreds of kilometers), where the solid angle is substantially constant (i.e. the solid geometry of $m_2$ is a frustum), then the second order term can become significant enough to measure. If the axis of this long mass was directed off axis to $mass_1$, then a torque would be applied to $m_1$. The $\delta_2^2$ term makes the force highly directional. This second order term could easily explain the spirals and the rotation of Galaxies. Also, the greater force in the short axis or the weaker force in the long axis of Galaxies could explain why they are flat.

It appears that the only difference between electric, magnetic, and gravitational forces is the difference in the characteristic attenuation factors of the Unitons traversing the specific media. It was shown that $\rho_0 L_0$ for gravity is in the units of gram/cm$^2$. But for magnetics $\rho_0 L_0$ has the units of Maxwell/cm$^2$, and for electrostatics the units are in statcoulomb/cm$^2$. It was shown earlier for gravity $k/(\rho_0 L_0)^2 = G$ where $k = 6.67 \times 10^{32}$ dynes/cm$^2$, and $\rho_0 L_0 = 10^{20}$ gram/cm$^2$. For magnetics or electrostatics $k/(\rho_0 L_0)^2 = 1$ in cgs. units. That means for magnetics $\rho_0 L_0 = 2.6 \times 10^{16}$ Maxwells/cm$^2$, and for electrostatics $\rho_0 L_0 = 2.6 \times 10^{16}$ statcoulomb/cm$^2$. Of course "k" is unchanged because it is a characteristics of the Uniton Flux Field.

One can now estimate the force generated by the Uniton Flux Field on a Magnetic Shaded Rotor device in realistic laboratory dimensions. Drawing of the proposed device is given in FIG. 9 and FIG. 10.

The second order term becomes:

$$\overrightarrow{Force} \text{ (second order)} \atop \text{(on magnet 1)} = \frac{k}{2} \frac{\rho_1 \delta_1 (\rho_2 \delta_2)^2}{(\rho_0 L_0)^3} A_1 \overrightarrow{d\Omega}. \qquad \text{Equation 4}$$

The second part of the second order term (see Equation 3) is much smaller and hence it is ignored. Since 4 kilogauss (4 kilomaxwell/cm$^2$) permanent magnets are readily available; a realistic value for Equation 4 is:

5 dynes of force or 5 milligrams of force@ g=981 cm/sec$^2$.

5 dynes of force can be measured and, hence the Magnetic Shaded Rotor Device can be used to verify the Uniton Flux Field Theory.

An electric dynamometer may be mounted concentric on the rotor shaft and the output torque measured, from which $\rho_0 L_0$ can be calculated in conjunction with the known machine parameters.

It is interesting to note that the calculated escape velocity, using classical mechanics, is greater than c from a spherical body of mass density $\rho_0 = 10^{15}$ gm/cm$^3$ (closed packed neutron structure) and a radius of a few $L_0$ (~1 km) units; and we believe Unitons can not escape from such a body if their velocity is "c" or less. A spherical body of this mass becomes a Uniton sink (Black Hole), and its mass will increase continuously until it becomes a Supernova.

DRAWINGS

FIG. 1. Is a schematic diagram of a Universal Particle Flux Field (Uniton Flux Field) with arbitrary 60° flux grid lines, and with a single spherical impedance, indicating singly attenuated Flux Lines. Each intersection represents schematically a spherical solid angle converging/diverging Uniton Flux trajectories, in 4 dimensions (spatial and time).

Figure 2:
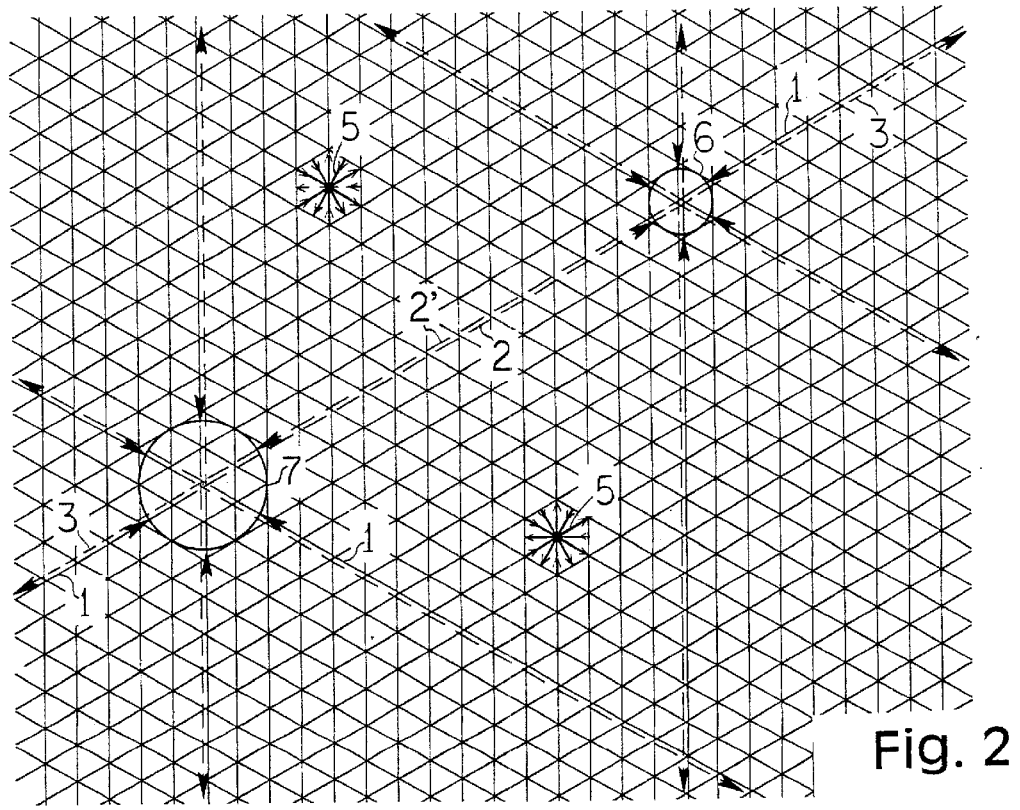

FIG. 2. Is a schematic diagram of a Uniton Flux Field with arbitrary 60° flux grid lines, and with two spherical impedances, indicating singly and doubly attenuated Flux Lines. Each intersection represents schematically a spherical solid angle converging/diverging UP Flux trajectories, in 4 dimensions (spatial and time).

Figure 3:
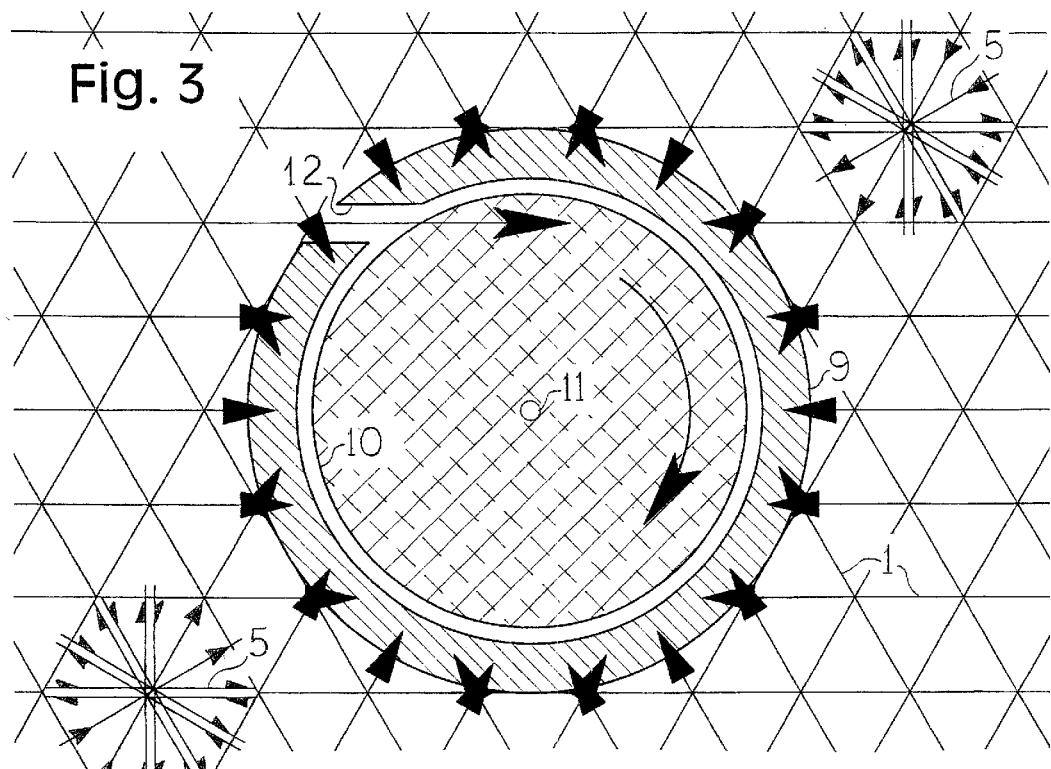

FIG. 3. Is a schematic diagram of the theoretical Shaded Rotor Uniton Flux Pressure Converter device, in an arbitrary 60° flux grid. Each intersection represents schematically a spherical solid angle converging/diverging Uniton Flux trajectory, in 4 dimensions (spatial and time).

Figure 4:
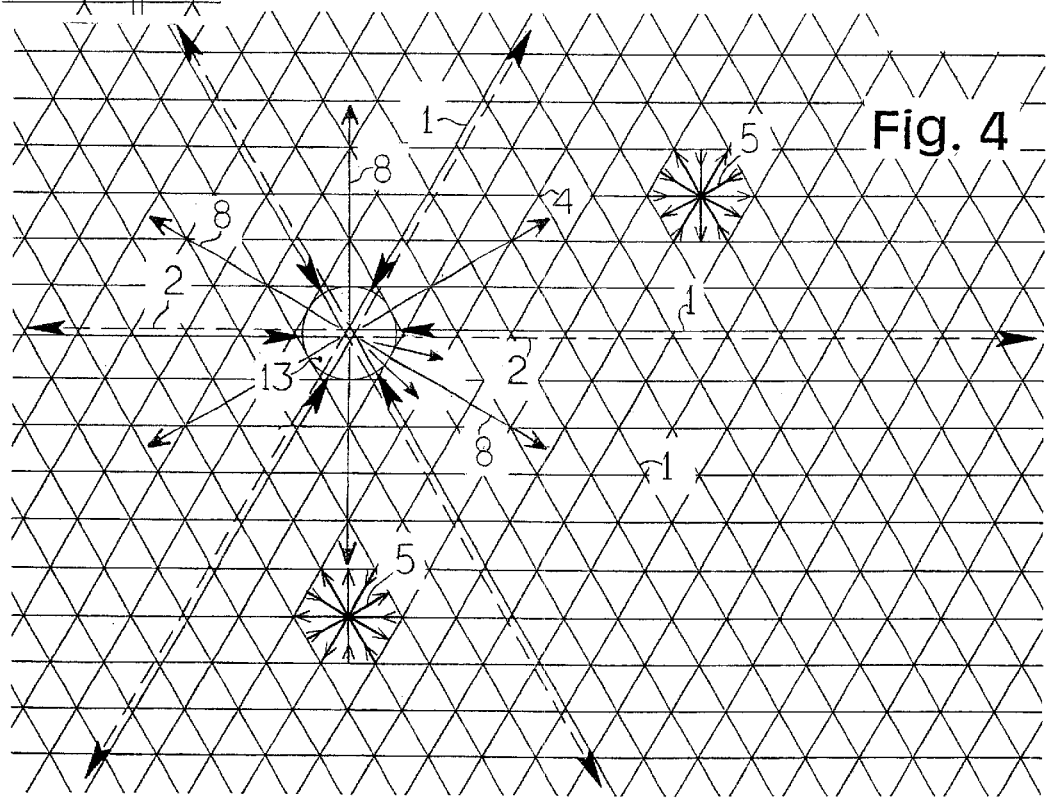

FIG. 4. Is a schematic diagram of the (spherical solid angle) Uniton Flux emanating from a Supernova, superimposed on the Universal Uniton Flux Field.

Figure 5:
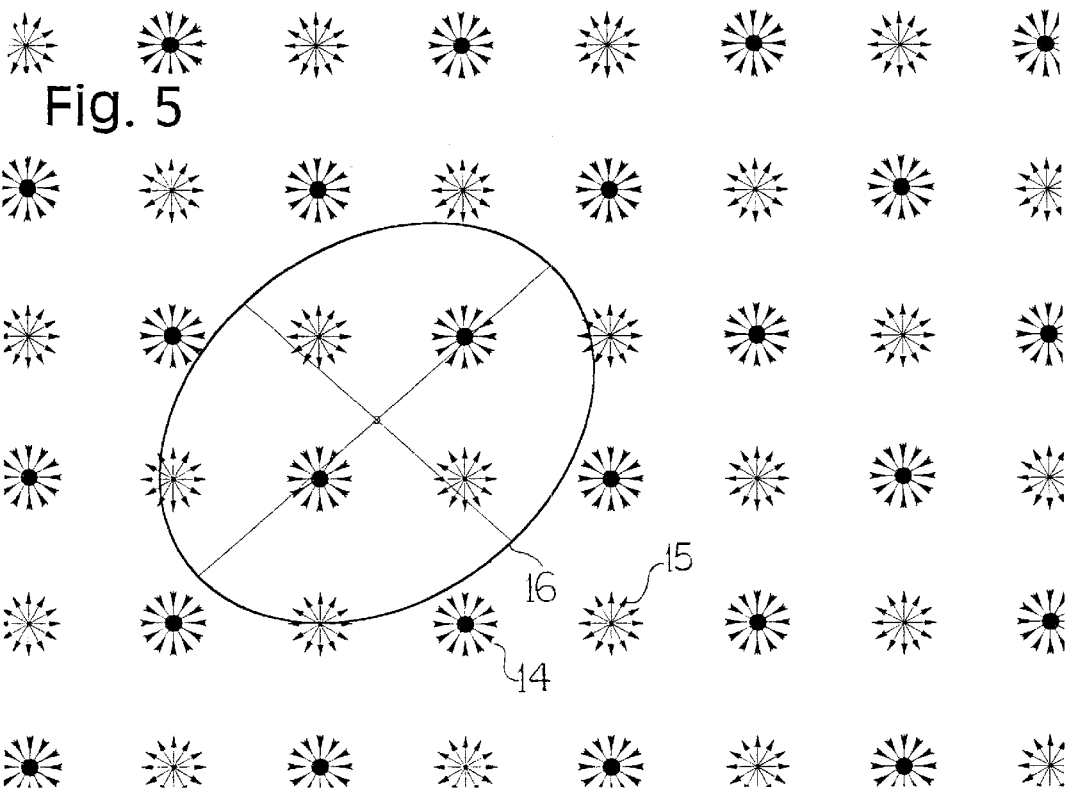

FIG. 5. Is a schematic diagram of Supernovae and Black Holes Dispersion in a rectangular array (purely for illustrative purposes) in one plane, with the detectable border of "our" Universe indicated in an oblique planar section.

Figure 6:
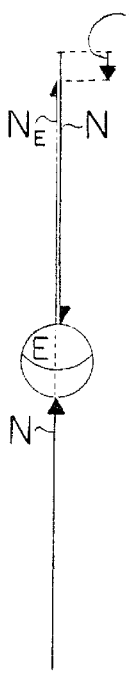

FIG. 6. Is a schematic diagram of the Earth's gravitational field vector "n" at the surface, resulting from the vector sum of "N" and "$N_E$", the vertical components of the Uniton Flux Field density in the vertical direction.

FIG. 7. Is a schematic diagram indicating characteristic elemental attenuation of the Uniton Flux traversing 2 equal elemental volumes with equal impedances 2 "$\Delta V_S$" in series, and 2 "$\Delta V_P$" in parallel.

FIG. 8. Is a schematic diagram of two adjacent parallel plates, with conventional symbols referred to in the Detailed Description.

FIG. 9. Is the top view of the Magnetic Shaded Rotor Uniton Flux Pressure Converter.

FIG. 10. Is an enlarged partial cross sectional elevational view of the Magnetic Shaded Rotor Uniton Flux Pressure Converter shown in FIG. 9.

Figure 11:
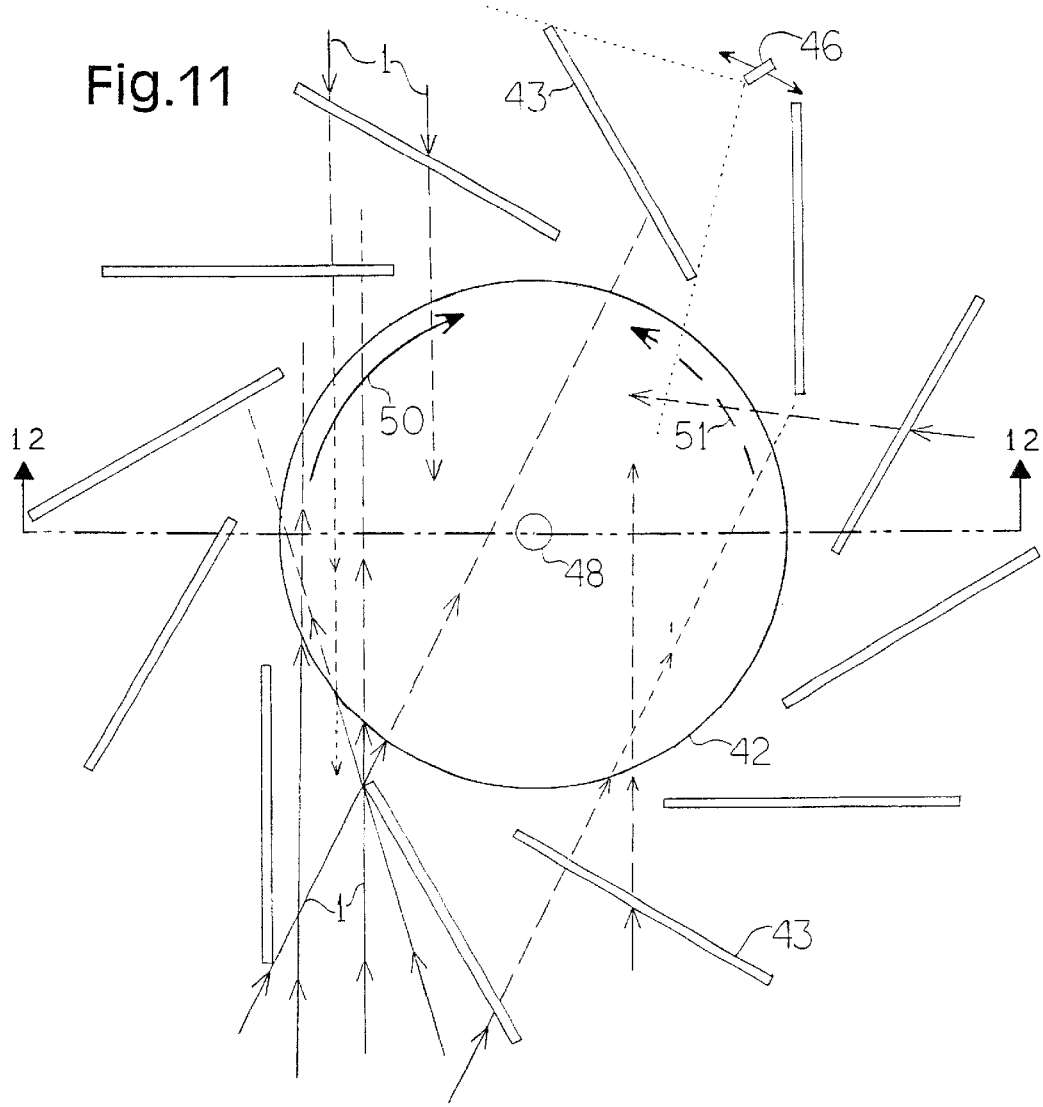

FIG. 11. Is a top view of the Electrostatic Shaded Rotor Uniton Flux Pressure Converter, with thin tangential stationary shading plates.

Figure 12:
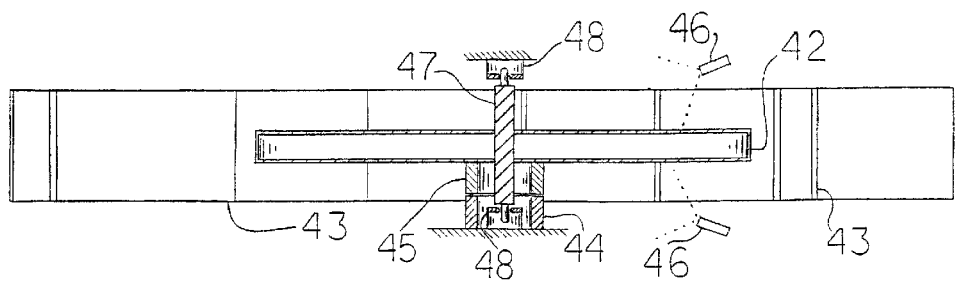

FIG. 12. Is an elevational view of the Electrostatic Shaded Rotor Uniton Flux Pressure Converter, with thin tangential stationary shading plates.

FIG. 13. Is a top view of the Electrostatic Shaded Rotor Uniton Flux Pressure Converter, with trapezoidal stationary shading plates of long flux impedance paths.

FIG. 14. Is an elevational view of the Electrostatic Shaded Rotor Uniton Flux Pressure Converter, with trapezoidal stationary shading plates of long flux impedance paths.

Figure 15:
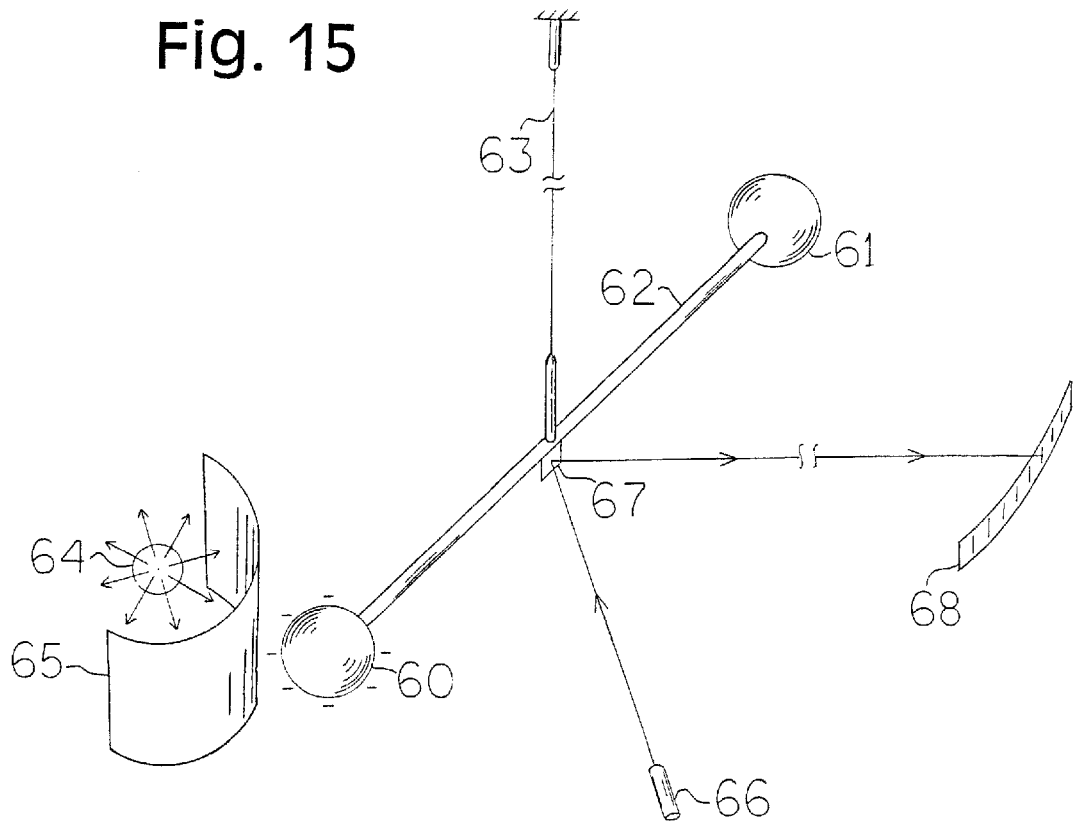

FIG. 15 Is a schematic isometric view of a modified Coulomb Torsional Balance set up to measure Neutrino Flux Pressure, from a nuclear fission driven high intensity Beta/Neutrino Source.

DETAILED DESCRIPTION

A schematic diagram of the proposed field configuration, with one spherical impedance, is shown in FIG. 1. A typical 60 degree grid is shown, with un-attenuated particle Flux Lines 1 (solid lines), and with singly attenuated Flux Lines 2 (dashed lines), which have traversed impeding body 6. Flux lines intersect at typical Grid Intersections 4. The actual particle flux field is in all four dimensions: X,Y,Z, and Time. At typical Grid Intersections 4, the Universal Particle Flux or Uniton Flux traverses substantially to and from every point in the Universe in four dimensional space (convergent/divergent field). A typical schematic spherical solid angle Convergent/Divergent Point 5 is shown at a typical Grid Intersection 4. The mean free path of the Universal Particle (Uniton), which from astronomical observations of gravitation between celestial bodies, appears to be measured in millions of light years in vacuum. With one impedance the flux field is substantially constant from all directions on Impeding Body 6, so that no net force is produced on it.

A flux field with two Impeding Bodies 6 and 7 is shown in FIG. 2. Full or Un-attenuated Flux 1 is impinging on both Impeding Bodies 6 and 7 from all directions except in directions facing each other. Typical singly attenuated flux lines between Impeding Bodies 6 and 7 are Flux Lines 2 and 2' (long dashed lines). Doubly attenuated Flux Lines 3 (short dashed lines) leaving the Impeding Bodies 6 and 7 respectively, have been attenuated by both Impeding Bodies 6 and 7. Thrust force results between these two bodies, resulting in accelerating these Impeding Bodies 6 and 7 toward each other because Flux Lines 2 and 2' are less dense than Flux Lines 1. For two bodies rotating around each other, like in the case of binary stars, we can expect the attenuated flux to vary relative to a fixed point; increased flux in the direction of alignment of the bodies, and nominal flux in all other directions. We believe that some of the electromagnetic and gravity flux signals emitted by binary stars are also produced in this manner.

We believe that the attenuation of the flux, which generates the force or thrust is not linear within the impeding body, but exponential. The attenuation can be expressed exactly in a power series of infinite order. The signs of the higher order or non linear terms alternate. The sign of the first order or linear attenuation term is of course positive. The second order or compound attenuation term is negative, i.e. it reduces the attenuated flux (by a relatively small amount). The third order or cubic effect is positive. The second order term is orders of magnitude smaller than the first order term, the third order term is orders of magnitude smaller than the second order term, and so on.

Newton's Laws of Gravitation substantially conforms to the above described Uniton Flux Field: Every mass "attracts" every other mass in the Universe. The force is a function of the inverse square of the spacing between masses. The force between masses is (substantially) directly proportional to the magnitude of the masses. The Newtonian Gravitational Force Equation can be derived by assuming that the absolute value of the flux decreases linearly through differential elements of the mass. However, for an exponential decay that typically occurs in nature, the "percentage" of the flux decreases linearly. In our exponential expansion, the first order term corresponds to Newton's Equation; but additional terms are required to define the exponential decay in matter. Even on a relatively low mass planet like the Earth, the relatively slight attenuation of the Uniton Flux traversing it results in significant gravitational forces on much smaller masses on the surface of the planet. One can begin to comprehend the immense density and energy content of this Uniton Flux Field.

We are designing and fabricating a device that is driven by the second order Uniton Flux attenuation effect. A schematic diagram is shown in FIG. 3. The principle of operation can probably best be understood by assuming for the moment, that Shading Ring 9 and Rotor 10 are made of materials that absorbs the Uniton Flux Field completely in a few centimeters of traverse. The centerline of Slot 12 in Shading Ring 9 is aligned slightly within the circumference of Rotor 10. Slot 12 allows some of the flux to impinge onto the periphery of Rotor 10 un-impeded. It is seen that under the previously assumed boundary conditions, Rotor 10 will rotate due to the nearly unidirectional impact of the Uniton Flux upon the periphery of Rotor 10. With a Shading Ring 9 and Rotor 10 of less attenuating material which is absorbing/scattering say only half of the flux, Rotor 10 should still rotate at a lower torque input. If we now consider realistic Uniton Flux attenuating materials, that attenuate only parts per $10^{12}$/cm or less of the flux, Rotor 10 should still rotate if the frictional and minimum energy-well parameters tending to stall Rotor 10, are small enough. The minimum energy conditions are generated by axial miss-alignments, non uniform fields at Rotor 10, and insufficient Rotor balance. Shading Ring 9 can be made of a magnetic material enclosing Rotor 10, which is also made of a magnetic material. Shading Ring 9 may also be made of an insulator which is electro-statically charged, and it encloses Rotor 10 which in this case is also made of a charged insulator. Shading Ring 9 and Rotor 10 made of a neutral mass is not considered practical on a Laboratory scale.

A schematic diagram of a Supernova 13, emanating a spherical solid angle Uniton Flux Field 8, superimposed on the Universal Uniton Flux Field is shown ire FIG. 4. In the vicinity of the Supernova, the Uniton Flux Field is dominated by the Uniton Flux radiated from the Supermova, and there is a net repulsive field in this region. As the distance from the Supernova is increased, the repulsive force diminishes substantially as the inverse square of the distance. At a sufficient distance from the Supernova, the Universal Uniton Flux Field will dominate. This mechanism disperses the Supermova and Black Holes across the Universe. A mixed spatial array of Black Holes 14 and Supernovae 15 at average energy output is indicated schematically in FIG. 5. The boundary of our detectable Universe 16 is shown in an oblique plane.

A schematic diagram of the attenuation or reduction of the number of incoming Unitons per unit area N after they traversed the Earth $N_E$ is indicated in FIG. 6. The sum of the vector components of the Uniton Flux in the vertical direction at the Earth's surface is $N-N_E=n$, and $n=Cg$, where g is the gravitational constant of the Earth, and C is a proportionality constant, related to the mass and radius of the Earth. The attenuation of the net vertical Uniton Flux vector n at the surface of the Earth, as it traverses two equal differential elemental volumes $\Delta V_S$ in series and $\Delta V_P$ in parallel are indicated on FIG. 7. As expected, the series mode attenuates very slightly less than the parallel one (second order effect). Hence the gravitational force produced on $2\Delta V_S < 2\Delta V_P$.

It is noted that a sensitive Balanced Beam device may be constructed with two identical rods pivoting on their centers of gravity at the ends of the Balanced Beam, respectively. One rod is placed in the vertical orientation, the other in the horizontal orientation; the vertical rod would be lighter than the horizontal rod. Unfortunately, our calculations indicate that this device would be too large for laboratory applications.

The derivation of the General Force Equation of the Uniton Flux Field utilizes two parallel plates are shown on FIG. 8 (see Discussions).

The drawing of the embodiment of the magnetic device is shown on FIG. 9, and FIG. 10. It comprises of a disc shaped Rotor 21 with a tapered cross section, in proximity to a similarly tapered Stator Disc 22. Rotor 21 contains a circular Rim 23 on its outside diameter, and Central Hub 24 on its inside diameter. Rotor 21 and Stator Disc 22 cross sections are tapered from the center to the circumference in order to provide a constant cylindrical cross sectional area at any radial position. This will provide a constant magnetic reluctance path in Rotor 21 and Stator Disc 22, and higher electromagnetic efficiency. Rotor 21 is attached to a central shaft 30, which is preferably vertical. Said Rotor Shaft 30 is mounted on low friction bearings 31, 32 and 33, 34. Said Stator Disc 22 contains circular Rim 26 on the outside diameter, and Central Hub 25 at the inside diameter of Stator 22. Rims 23 and 26, and Central Hubs 24 and 25 are in close proximity to each other respectively. A spiral coil 18 and 19 of insulated electrical wire is mounted on Stator Disc 22; when it is energized it drives magnetic flux into said Rims 23 and 26, and said flux is returned through Rotor 21 to Central Hubs 24 and 25, and to Stator Disc 22. Thus a magnetic field is induced in Rotor 21 without the use of commutators. Slender permanent magnetic Stator Bars 27, are placed tangential to Rim 23 of Rotor 21. A combination of 16 possible field directions exist. The two preferred directions of the magnetic field for Stator Bars 27 are along the Stator Bar 27 axis, or perpendicular to the Stator Bar axis and parallel to Rotor Shaft 30. The preferred shape of Stator Bars 27 is a truncated pyramid, however prism shaped Stators should work (with less efficiency). With magnetic field of Stator Bar 27 aligned with the axis of Rotor 21, the Top Surface 39 of Stator Bar 27 is preferably aligned with the top surface of Rotor 21 at Rim 23. Care must be taken to separate sufficiently the polarities of Stator Bars 27, one pole being on Top Surface 39 the other on Bottom Surface 40, so that a sufficiently strong magnetic field is maintained. With the magnetic field aligned with the axis of Stator Bars 27, the Stator Bar 27 axis should be aligned with the (vertical thickness) center of Rotor 21 at Rim 23 in the axial direction of Rotor Shaft 30. Pairs of Stator Bars 27 parallel to each other, are placed on opposite sides of Rotor 21. This configuration is necessary in order to balance the lateral loading on the radial bearings of Rotor Shaft 30. A multitude of pairs of stator bars parallel to each other may be placed equally spaced around the rotor. The optimum number for a given rotor, is a function of the length and cross section of the stator bars. Rotor 21 may be magnetized along the radial direction, or along the circular direction concentric to the axis of Shaft 30.

Second order or compound shading of the Uniton Flux Field should occur as the Uniton Flux traverses Stator Bars 27. This compound shading is sharply focused on the circumference of Rotor 21, since compound shading falls off sharply as the flux ray angle increases relative to the axis of the Stator Bar. The Uniton Flux traversing the entire length of Stator Bars 27 are compound attenuated by each element traversed, and they are attenuated more than the integrated sum of the oblique flux traversing the Stator Bars. This preferential shading of Rotor 21, should result in a net counter-clockwise torque on Rotor 21, and hence said Rotor 21 should rotate in the counter-clockwise direction, if the bearing frictional torque is low enough, and the rotor is properly balanced and leveled. Also the magnetic flux of the Stator and Rotor must be sufficiently uniform at the outside and inside circumferences respectively, so that minimum magnetic energy wells are sufficiently low so that they do not stall the Rotor 21.

It is noted that each element of Stator Bars 27 are perfectly symmetrical to Rotor 21 axis, and hence no "first order" torque should be produced on Rotor 21. The terms of the power series expansion of the attenuation exponent has alternate positive and negative terms, indicating clockwise and counter-clockwise forces. The second order term is by far the most significant in driving Rotor 21.

It is also noted that localized magnetization may occur on the perimeter of Rotor 21, due to the proximity of the stator bars. This magnetization would have the effect of stalling said rotor in the minimum magnetic energy position. In order to eliminate this problem, the rotor and the electro magnetic circuit were designed such that the rotor will be essentially fully saturated with magnetic flux, so that substantially no further magnetization can occur.

It would be of course possible to use a fully magnetized permanent magnetic rotor, which would be nearly impossible to magnetize or de-magnetize by said stator bars. The non-homogeneity of the magnetic material could be a problem at "low" input torque to the rotor. It is likely that wound coil electromagnets can be made more homogeneous than permanent magnets. Moreover, relatively large and powerful permanent magnets are difficult and dangerous to handle in the vicinity of other similar magnets, because of the continuous strong magnetic forces.

Another feature of this design is its ability to provide a substantial magnetically supported rotor. The "magnetic attraction" between the Rotor 21 and the Stator Disc 22, can be utilized to lift off most of the weight of said Rotor 21, so that the thrust bearing friction is significantly reduced. In the actual bearing indicated in this patent, an upper and a lower bearing are utilized on the vertical Rotor Shaft 30. The lower bearing comprises a Radial Bearing 31 engaging the extension Pin 32, of Rotor Shaft 30. The upper bearing assembly comprises Radial Bearing 33 and Thrust Bearing 35 engaging extension Pin 34 of Rotor Shaft 30. When the Stator Coil 26 is energized, Rotor 21 is lifted up against Thrust Bearing 35. In order to completely saturate Rotor 21 with magnetic flux, and to minimize loading on Thrust Bearing 35, it is necessary to mount Weight 36 on Rotor Shaft 30. The adjustment of the stator current, the stator to rotor air (or vacuum) gap, and the rotor weight, can minimize the thrust loading on Thrust Bearing 35 to milligrams. The magnetic fields between stator bars 27 and Rotor rim 23 must be oriented such that the magnetic fields produce an "attraction" or "repulsion" force. In either case, the rotor is expected to rotate due to the compound attenuation of the Uniton Flux Field, however in opposite directions respectively. There are several magnetic polarity configurations possible of this device; at this time we do not know which configuration is the most efficient. In one preferred configuration Stator Bars 27 are polarized so that the Poles 37 are North and Poles 38 are South, while Rotor 21 is radially polarized. Another preferred configuration is obtained by making the Top Surfaces 39 of the Stator Bars 27 North and the Bottom Surface 40 South. In the preferred configuration the Top Surfaces 39 of Stator Bars 27 are co-planar with Top Surfaces 41 of Rotor 21. The above Stator Bar 27 pole configurations may be used with a permanent magnet Rotor 21 being polarized tangential to its circumference (circular configuration). In another alternative Rotor 21 is polarized in a circular configuration by a torroidal electric coil wound around the circumference of Rotor 21, in this alternative slip rings are needed to feed the electric current to and from the torroidal coil.

A calibrated dynamo with a load resistor may be mounted on the Rotor Shaft 30, in order to measure the output torque of Rotor 21; from the torque and from other machine parameters, $\rho_0 L_0$ can be calculated.

The Electrostatic Uniton Flux Pressure Converter is shown on FIG. 11 and FIG. 12. It comprises an electrostaticly charged dielectric Rotor 42, and electro-staticly charged Stator Plates 43. Rotor 42 is mounted on low friction vertical magnetic suspension bearings comprising a stationary Ring Magnet 44 axially polarized and concentric with Rotor 42, and an axially polarized Ring Magnet 45 mounted concentric on Rotor 42 with the like poles of Ring Magnets 44 and 45 facing each other in close proximity. Rotor Shaft 47 is supported laterally by low friction Radial Bearings 48. Of course cryogenic/superconductive suspension which requires no lateral bearings would be an even lower friction device, but it would be prohibitively costly for most Laboratories and Physics Departments.

The dielectric rotors can be made relatively light in weight, unlike the magnetic rotors, so that the mechanical bearing force can be relatively small. The charged dielectric Stator Plates 43 are attenuating the traversing Uniton Flux, and they are arranged such that they substantially do not intercept or attenuate Uniton Flux 1 impinging on Rotor 42 in the direction of rotation, or in the direction of forward torque 50, and Stator Plates 43 impede or shade the Flux Field and cause attenuated Uniton Flux 2 to impinge upon surface charged Rotor 42 in the direction opposite to the direction of forward torque 50. For increased shading of Rotor 42 the Stator Plates 43 are made several times wider than Rotor 42, in the axial direction. Dielectric material must be used for the reason that a substantially uniform charge distribution is required on Rotor 42 and on Stator Plates 43, and conductive materials can not be used since in a conductor the Uniton Flux will push all of the unlike charges together as close as possible within confines of the conductors. Like charges conversely will be pushed apart as far as possible within the confines of the conductor. Fractional polarization of the Uniton Flux traversing the media can explain electrostatic (and magnetic) repulsion. High Alumina ceramic is the preferred material for the dielectric components, however many other insulators are suitable for this purpose. Electrostatic charge may be deposited on Rotor 42 and Stator Plates 43 by a multitude of electron guns 46 when the device is enclosed in a vacuum chamber. Vacuum environment will permit the application of significantly higher voltages than that in atmospheric air, without an arc-over. Other methods may be utilized to charge up the dielectric surfaces, such as brush friction.

Negative charging may be achieved by "low" velocity electron beams; "high" velocity electron beams can produce positive charging by knocking out electrons from the target. Positive charging may also be produced by non metallic positive ion beams for charging the dielectric, and substantially not affecting its conductivity.

The Electrostatic Uniton Flux Pressure Converter should operate with like charges on Rotor 42 and Stator Plates 43, or unlike charges respectively; only the direction of rotation would be opposite. The preferred charging is negative, due to its relative simplicity of achieving it, using an electron guns with flood beam outputs. Also, with like voltages on Rotor 42 and Stator Plates 43, there would be no interelectrode arcing potential, only an arcing potential to ground would exist. However, our estimates indicate that at the maximum achievable Stator Plate 43 flux attenuation in relatively small laboratory apparatus, Forward Torque 50 and Reverse Torque 51 are substantially equal, and Rotor 42 will not be Uniton Flux driven. As Stator Plate 43 voltages are increased in a relatively large scale device and hence the flux impedance of these Stator Plates 43 are increased, at some magnitude of impedance Forward Torque 50 overtakes Reverse Torque 51, and Rotor 42 should be driven by the unbalanced Uniton Flux pressure on Rotor 42. It is noted that this electrostatic charge phenomenon is a surface effect, while the magnetic and gravitational effects are bulk phenomena. For this reason, in the case of the charged dielectrics, all of the Uniton Flux attenuation occurs as it traverses the charged boundary layers.

Another type of electrostatic Uniton Flux Converter is shown on FIG. 13 and FIG. 14, whose operating principles more closely resembles the operating principles of the Magnetic Device of FIG. 9 and FIG. 10.

In the device indicated in FIG. 13 and FIG. 14, the Top Plane 52 of cylindrical Rotor 42 is in a common plane with the Top Plane 54 of Stator Plates 56, and the Bottom Plane 53 of Rotor 42 is in the same plane with the Bottom Plane 55 of Stator Plates 56. The Stator Plates 56 are of a trapezoidal configuration, this facilitates the interception of a larger significant Uniton Flux Field upon Rotor 42 than a prism shaped stator would. In this device the Uniton Flux 1 traverses a much longer path in the charged boundary layers than in the previously described electrostatic device. As indicated in the Mathematical Treatise, in the first order of the power series expansion, extending the length L of the Stator Plates 56 would be a "wash-out".The integrated sum of all of the torque vectors around the circumference of Rotor 42 is zero. However, due to the $L^2$ term in the second order of the expansion, the length effect being "strong" near the axis of Stator Plates 56, hence the integrated sum of all of the torque vectors around the circumference of Rotor 42 is not zero. The net Uniton Flux Pressure should be sufficient to drive Rotor 42 on a laboratory scale device. A multitude of parallel pairs of Stators Plates 56 may be utilized.

Two Electron Guns 46 centrally pivoted on revolving arms 57, one above Top Planes 52 and 54 and one below Bottom Planes 53 and 55, are depositing electrons on top and bottom surfaces of Rotor 42 and Stator Plates 56 respectively.

A calibrated electric dynamometer with a calibrated load resistor may be mounted on the Rotor Shaft 47, in order to measure the output torque of Rotor 42. To this measured torque, the frictional torque is added to obtain the total input torque to the rotor. From the total rotor input torque and from other known machine parameters $\rho_0 L_0$ can be calculated. A very sensitive method of the rotor frictional torque measurement involves the slope of the un-driven "rotor spin down" curve which is an inverse function of the rotor bearing frictional torque. These measurements must be performed at rotor speeds under 10 RPM so that the air frictional torque is minimized, unless the measurements are done in vacuum. From the equilibrium speed of the Uniton Flux driven rotor and from the bearing frictional torque, the rotor torque due to the Uniton Flux Pressure can be calculated.

In order to measure the force of a Neutrino flux on a charged and on a neutral mass the following experiment is proposed:

The schematic diagram of a modified Coulomb Torsional Balance is shown on FIG. 15, where electrostaticly Charged Globe 60 is mounted on Horizontal Support Beam 62 which is pivoted on Suspension Filament 63 connected at the center to the Horizontal Support Beam 62. Charged Globe 60 is counter-balanced against gravity by a similar but Neutral Globe 61 on the far end of Horizontal Support Beam 62. A Beta/Neutrino Source 64 is located in the vicinity of Charged Globe 60, some of the flux is directed substantially perpendicular to the Horizontal Support Beam 62. For maximum force vector coupling the Beta/Neutrino Source 64 must be substantially in a common horizontal plane with the Horizontal Support Rod 62. Beta/Neutrino Source 64 is enclosed in Beta Shield 65, in order to eliminate a possible Electron flux pressure interference in the measurement. Repeat the experiment with Globe 60 discharged, and compare data. If the Neutrino is the elusive Uniton, then we should expect orders of magnitude greater force on the charged globe than on the uncharged globe.

The high intensity Beta/Neutrino Source 64 may be fission induced Beta decay of a target in a linear accelerator. The deflection of Horizontal Support Beam 62 caused by Neutrino Flux Pressure on Charged Globe 60 is amplified by a long arm Laser device. Laser beam is emitted from Laser Source 66 and the Laser beam is reflected onto Scale 68 by Mirror 67 mounted to the center of Horizontal Support Beam 62. Suspension Filament 63 is made of less than 0.010' diameter Tungsten or hardened high Carbon Steel. For high deflection sensitivity, the filament and the distance to the scale should be about one order of magnitude longer than the length of the Horizontal Support Beam 62, while the length of Horizontal Support Beam 62 should be not less than 1 meter.

It should be appreciated by those skilled in the art, that this invention may make various embodiments other than heretofore described. Accordingly we intend by the following claims to cover all modifications within the spirit and scope of our invention.

What we claim is new and pray to secure by Letters Patent of the United States is:

1. An apparatus to detect a hypothetical Universal Particle Flux Field by partially shading from said Field a magnetized rotor in one direction of rotation said magnetized rotor is mounted on a rotor shaft which is mounted on low friction bearings with a multitude of elongated stationary shading magnets preferably of a truncated pyramidal shape uniformly positioned around the circumference of said rotor and said elongated stationary shading magnet's longitudinal axes are positioned in a plane substantially perpendicular to said rotor shaft and the extension of said longitudinal axes are slightly within the rotor circumference with the small end of the truncated pyramidal shading magnets facing said rotor.

2. The apparatus as described in claim 1, wherein said truncated pyramidal stationary shading magnets are polarized substantially parallel to said rotor shaft said rotor shaft is vertical and the upper surface planes of said elongated stationary shading magnets substantially align with the upper surface planes of said rotor and the lower surface planes of said elongated stationary shading magnets are separated sufficiently from the upper surface planes so that a sufficiently strong magnetic field is maintained on said upper surface planes of said elongated stationary shading magnets.

3. The apparatus as described in claim 1, wherein said elongated stationary shading magnets are polarized along the longitudinal axes and said longitudinal axes are substantially centered on the thickness of said rotor at the circumference.

4. The apparatus as described in claim 1, wherein said rotor shaft is vertical and said rotor is radially magnetized by a stationary electromagnet mounted above said rotor in close proximity and a concentric weight is mounted on said rotor shaft in order to substantially compensate for the vertical force between the stationary magnet and said rotor wherein any error in vertical force compensation is taken up by a thrust bearing.

5. The apparatus as described in claim 2, wherein said rotor shaft is vertical and said rotor is radially magnetized by a stationary electromagnet mounted above said rotor in close proximity and a concentric weight is mounted on said rotor shaft in order to substantially compensate for the vertical force between the stationary magnet and said rotor wherein any error in vertical force compensation is taken up by a thrust bearing.

6. The apparatus as described in claim 2, wherein said rotor shaft is vertical and said rotor is circularly magnetized by a stationary electromagnet mounted above said rotor in close proximity and a concentric weight is mounted on the rotor axis in order to substantially compensate for the vertical force between said stationary magnet and said rotor wherein any error in said force compensation is taken up by a thrust bearing.

7. The apparatus as described in claim 2, wherein the apparatus is enclosed in a vacuum chamber in order to minimize air friction.

8. The apparatus as described in claim 3, wherein the apparatus is enclosed in a vacuum chamber in order to minimize air friction.

9. An apparatus to detect a hypothetical Universal Particle Flux Field by partially shading from said Field a rotor in one direction of rotation, comprising a dielectric charged rotor mounted on a central shaft with low friction bearings mounted on each end of said central shaft with a multitude of elongated charged dielectric stationary shading plates uniformly positioned around the circumference of said rotor and are substantially tangent to said rotor.

10. The apparatus as described in claim 9, wherein said rotor is supported by a vertical central shaft supported by a magnetic suspension comprising a stationary ring magnet axially polarized and concentric with close proximity to and located below a similar ring magnet mounted concentric on said vertical central shaft with like poles facing each other with lateral bearings supporting both ends of said vertical central shaft.

11. The apparatus as described in claim 9, wherein the apparatus is enclosed in a vacuum chamber and said dielectric charged rotor and said dielectric stationary shading plates are charged with one or more electron guns.

12. The apparatus as described in claim 10, wherein the apparatus is enclosed in a vacuum chamber and said dielectric charged rotor and said dielectric stationary shading plates are charged with one or more electron guns.

13. An apparatus to detect a hypothetical Universal Particle Flux Field by partially shading from said Field a rotor in one direction of rotation, comprising a dielectric charged disc shaped rotor mounted on a shaft with low friction bearings with a multitude of elongated charged stationary shading plates said shading plates are preferably of trapezoidal shape with the two parallel trapezoidal surface planes are substantially coplanar with the two parallel surface planes of said disc shaped rotor respectively said shading plates are uniformly positioned around the circumference of said rotor with the extension of the axes of the trapezoidal plates aligned slightly within the circumference of said disc shaped rotor with the small ends of the trapezoidal plates facing the rotor.

14. The apparatus as described in claim 13, wherein the apparatus is enclosed in a vacuum chamber and said dielectric rotor and said dielectric stator plates are charged with one or more electron guns.

15. The apparatus as described in claim 1, wherein an electric dynamometer is mounted on the rotor shaft in order to determine the torque on the rotor needed to calculating the Universal Constant $\rho_0 L_0$.

16. The apparatus as described in claim 2, wherein an electric dynamometer is mounted on the rotor shaft in order to determine the torque on the rotor needed to calculating the Universal Constant $\rho_0 L_0$.

17. The apparatus as described in claim 3, wherein an electric dynamometer is mounted on the rotor shaft in order to determine the torque on the rotor needed to calculating the Universal Constant $\rho_0 L_0$.

18. The apparatus as described in claim 4, wherein an electric dynamometer is mounted on the rotor shaft in order to determine the torque on the rotor needed to calculating the Universal Constant $\rho_0 L_0$.

19. The apparatus as described in claim 5, wherein an electric dynamometer is mounted on the rotor shaft in order to determine the torque on the rotor needed to calculating the Universal Constant $\rho_0 L_0$.

20. The apparatus as described in claim 6, wherein an electric dynamometer is mounted on the rotor shaft in order to determine the torque on the rotor needed to calculating the Universal Constant $\rho_0 L_0$.

21. The apparatus as described in claim 8, wherein an electric dynamometer is mounted on the rotor shaft in order to determine the torque on the rotor needed to calculating the Universal Constant $\rho_0 L_0$.

22. The apparatus as described in claim 13, wherein an electric dynamometer is mounted on the rotor shaft in order to determine the torque on the rotor needed to calculating the Universal Constant $\rho_0 L_0$.

23. The apparatus as described in claim 14, wherein an electric dynamometer is mounted on the rotor shaft in order to determine the torque on the rotor needed to calculating the Universal Constant $\rho_0 L_0$.

24. An apparatus to detect a hypothetical Universal Particle Flux Field by partially shading from said Field a magnetized rotor in one direction of rotation said magnetized rotor is mounted on a rotor shaft which is mounted on low friction bearings said magnetized rotor is surrounded by a magnetized shading ring said shading ring contains a multitude of open slots uniformly positioned around the circumference of said rotor and said open slot's longitudinal axes are positioned in a plane perpendicular to the rotor shaft and the extension of said longitudinal axes are slightly within the rotor circumference in order to permit some of the Universal Particle Flux to impinge unimpeded through said open slots in one direction on the periphery of the rotor in order to produce a net torque on said rotor in one direction of rotation.

25. The apparatus as described in claim 24, wherein an electric dynamometer is mounted on the rotor shaft in order to determine the torque on the rotor needed for calculating the Universal Constant $\rho_0 L_0$.

* * * * *